US008409752B2

(12) United States Patent
Cho et al.

(10) Patent No.: US 8,409,752 B2
(45) Date of Patent: Apr. 2, 2013

(54) ACTIVE MATERIAL FOR BATTERY AND BATTERY HAVING THE SAME

(75) Inventors: Jae-Phil Cho, Cheonan (KR); Geun-Bae Kim, Suwon (KR); Sang-Moon Hwang, Cheonan (KR); Yong-Chul Park, Cheonan (KR); Won-Il Jung, Cheonan (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 12/727,510

(22) Filed: Mar. 19, 2010

(65) Prior Publication Data

US 2010/0183922 A1 Jul. 22, 2010

Related U.S. Application Data

(63) Continuation of application No. 11/507,547, filed on Aug. 22, 2006, now Pat. No. 7,713,659, which is a continuation of application No. 09/995,868, filed on Nov. 29, 2001, now Pat. No. 7,135,251.

(60) Provisional application No. 60/297,783, filed on Jun. 14, 2001, provisional application No. 60/304,793, filed on Jul. 13, 2001.

(51) Int. Cl.
*H01M 4/58* (2010.01)
*B05D 5/12* (2006.01)

(52) U.S. Cl. ............... 429/218.1; 429/231.1; 429/231.9; 429/231.5; 429/231.95; 429/231.6; 429/221; 429/223; 429/224; 427/126.6; 427/126.4; 427/126.3; 252/182.1

(58) Field of Classification Search ................. None
See application file for complete search history.

(56) References Cited

U.S. PATENT DOCUMENTS

| 5,169,736 A | 12/1992 | Bittihn et al. |
| 5,292,601 A | 3/1994 | Sugeno et al. |
| 5,705,291 A * | 1/1998 | Amatucci et al. ............. 429/137 |
| 5,753,387 A | 5/1998 | Takami et al. |
| 6,287,726 B1 * | 9/2001 | Ohta et al. ..................... 429/223 |
| 7,135,251 B2 | 11/2006 | Cho et al. |

FOREIGN PATENT DOCUMENTS

| EP | 0 413 331 | 2/1991 |
| EP | 0 582 293 | 2/1994 |
| EP | 0 853 347 | 7/1998 |
| JP | 08-138670 | 5/1996 |
| JP | 09-055210 | * 2/1997 |
| JP | 11-016566 | 1/1999 |

(Continued)

OTHER PUBLICATIONS

U.S. Appl. No. 11/507,547, filed Aug. 22, 2006, Jae-Phil Cho et al., Samsung SDI Co., Ltd.

(Continued)

*Primary Examiner* — Barbara Gilliam
*Assistant Examiner* — Angela Martin
(74) *Attorney, Agent, or Firm* — Christie, Parker & Hale, LLP

(57) ABSTRACT

An active material for a battery includes an electrochemically reversibly oxidizable and reducible base material selected from the group consisting of a metal, a lithium-containing alloy, a sulfur-based compound, and a compound that can reversibly form a lithium-containing compound by a reaction with lithium ions and a surface-treatment layer formed on the base material and comprising a compound of the formula $MXO_k$, wherein M is at least one element selected from the group consisting of an alkali metal, an alkaline earth metal, a group 13 element, a group 14 element, a transition metal, and a rare-earth element, X is an element that is capable of forming a double bond with oxygen, k is a numerical value in the range of 2 to 4.

17 Claims, 19 Drawing Sheets

FOREIGN PATENT DOCUMENTS

| | | | |
|---|---|---|---|
| JP | 11-111295 | * | 4/1999 |
| JP | 11-185758 | | 7/1999 |
| JP | 2002-231227 | | 8/2002 |

OTHER PUBLICATIONS

European Search Report dated Sep. 17, 2010, for corresponding European Patent application 02008296.2, noting U.S. Patent 5,705,291.

European Search Report dated Jan. 27, 2012, for corresponding European Patent application 11164704.6, 7 pages.

Cho, J., *Improved thermal stability of LiCoO$_2$ by nanoparticle AlPO$_4$ coating with respect to spinel Li$_{1.05}$Mn$_{1.95}$O$_4$*, Electrochemistry communications, vol. 5, Jan. 15, 2003, pp. 146-148, XP 002667395.

European Search Report dated Sep. 12, 2011, for corresponding European Patent application 11164704.6, 3 pages.

European Patent Office action dated Nov. 13, 2012 corresponding to EP12186249.4, 1 sheet.

\* cited by examiner

Oxygen depletion region

FIG.12

| Depth (Å) | O | Al | P | Co (at.%) | |
|---|---|---|---|---|---|
| 0 | 74.57 | 5.91 | 4.75 | 14.77 | |
| 24.2 | 74.69 | 4.6 | 4.61 | 16.1 | → Solid-solution compound of surface-treatment layer |
| 37.6 | 74.05 | 3.8 | 3.23 | 18.92 | |
| 75.2 | 74.69 | 2.35 | 3 | 24.96 | |
| 112.8 | 74.59 | 1.01 | 1.05 | 28.35 | |
| 150.4 | 74.85 | 0.95 | 0.65 | 28.55 | |
| 188 | 72.35 | 0.32 | 0.23 | 27.1 | |
| 225.6 | 72.89 | 0.03 | 0.05 | 27.03 | |
| 263.2 | 65.59 | 0.01 | 0 | 33.76 | → $CoO_2$ |
| 300.8 | 65.71 | 0.01 | 0 | 34.49 | |
| 338.4 | 65.23 | 0.01 | 0 | 35.35 | |
| 376 | 65.16 | 0.01 | 0 | 35.5 | |

| Depth(μm) | Co | P | Al | |
|---|---|---|---|---|
| 0 | 50.98 | 24.41 | 24.60 | |
| 1 | 99.88 | 0.07 | 0.05 | |
| 2 | 100 | 0 | 0 | |
| 3 | 100 | 0 | 0 | → Al and P are |
| 4 | 100 | 0 | 0 | not detected |
| 5 | 100 | 0 | 0 | |
| 6 | 100 | 0 | 0 | |
| 7 | 100 | 0 | 0 | |
| 8 | 99.96 | 0.02 | 0.02 | |
| 9 | 69.38 | 15.03 | 15.58 | |

ACTIVE MATERIAL FOR BATTERY AND BATTERY HAVING THE SAME

CROSS REFERENCE TO RELATED APPLICATIONS

This application is a continuation of U.S. application Ser. No. 11/507,547, filed Aug. 22, 2006, now U.S. Pat. No. 7,713,659 now allowed, which is a continuation of U.S. application Ser. No. 09/995,868 filed Nov. 29, 2001, issued U.S. Pat. No. 7,135,251, which claims the benefit under 35 U.S.C. §119(e) of the U.S. Provisional Application Ser. No. 60/297,783, entitled "ACTIVE MATERIAL FOR BATTERY AND METHOD FOR PREPARING SAME", filed Jun. 14, 2001, and 60/304,793, of the same title, filed Jul. 13, 2001.

BACKGROUND OF THE INVENTION

1. Field of the Invention

The present invention relates to an active material for a battery and a method of preparing the same, and more specifically to an active material for a battery with excellent electrochemical characteristics and thermal stability, and a method of preparing the same.

2. Description of the Related Art

Recently, in relation to trends toward more compact and lighter portable electronic equipment, there has been a growing need to develop a high performance and large capacity battery to be used for electric power for portable electronic equipment. Also, there has been extensive research on batteries with good safety characteristics and low cost.

Generally, batteries are classified as primary batteries that can be used only once and secondary batteries that are rechargeable. Primary batteries include manganese batteries, alkaline batteries, mercury batteries, silver oxide batteries and so on, and secondary batteries include lead-acid storage batteries, Ni-MH (nickel metal hydride) batteries, nickel-cadmium batteries, lithium metal batteries, lithium ion batteries, lithium polymer batteries and lithium-sulfur batteries.

These batteries generate electric power by using materials capable of electrochemical reactions at positive and negative electrodes. Factors that affect battery performance characteristics such as capacity, cycle life, power capability, safety and reliability, include electrochemical properties and thermal stability of active materials that participate in electrochemical reactions at the positive and negative electrodes. Therefore, research to improve the electrochemical properties and thermal stability of the active materials at the positive and negative electrodes continues.

Among the active materials currently being used for negative electrodes of batteries, lithium metal provides both high capacity because it has a high electric capacity per unit mass and high voltage due to a relatively high electronegativity. However, since it is difficult to assure the safety of a battery using lithium metal, other materials that can reversibly deintercalate and intercalate lithium ions are being used extensively for the active material of the negative electrodes in lithium secondary batteries.

Lithium secondary batteries use materials that reversibly intercalate or deintercalate lithium ions during charge and discharge reactions for both positive and negative active materials, and contain organic electrolyte or polymer electrolyte between the positive electrode and the negative electrode. This battery generates electric energy from changes of chemical potential during the intercalation/deintercalation of lithium ions at the positive and negative electrodes.

Lithium metal compounds of a complex formula are used as the positive active material of the lithium secondary battery. Typical examples include $LiCoO_2$, $LiMn_2O_4$, $LiNiO_2$, $LiNi_{1-x}Co_xCo_2$ ($0<x<1$), $LiMnO_2$ and a mixture of these compounds. Manganese-based positive active materials such as $LiMn_2O_4$ or $LiMnO_2$ are the easiest to synthesize, less costly than the other materials, and environmentally friendly. However, these manganese-based materials have relatively low capacity. $LiCoO_2$ has good electric conductivity, high battery voltage and excellent electrode characteristics. This compound is presently the most popular material for positive electrodes of commercially available Li-ion batteries. However, it is relatively expensive and has low stability during charge-discharge at a high rate. $LiNiO_2$ is currently the least costly of the positive active materials mentioned above and has a high discharge capacity, but it is difficult to synthesize and the least stable among the compounds mentioned above.

The above active materials are lithiated intercalation compounds in which stability and capacity of active material is determined by the nature of intercalation/deintercalation reactions of lithium ions. As the charging potential increases, the amount of Li deintercalation increases, thus increasing the electrode capacity, but thermal stability of the electrode decreases steeply due to its structural instability. When the interior temperature of the battery increases in the fully charged state, the bonding energy between the metal ions and the oxygen of the active material decreases, releasing oxygen when a temperature above a threshold value is reached. For example, $LiCoO_2$ active material in a charged state has the formula $Li_{1-x}CoO_2$, where $0<x<1$. Because the active material having the above structural formula is unstable, especially when $x>0.5$, if the interior temperature of the battery increases beyond the threshold value, oxygen gas ($O_2$) is released. Since the reaction of this oxygen with organic electrolyte in the battery is highly exothermic, a thermal runaway situation may be created in the battery, and this may cause an explosion in the battery. Therefore, it is desirable to control the threshold temperature and the amount of exothermic heat evolved from the reaction in order to improve the safety of the battery.

One way of controlling the threshold temperature and the amount of exothermic heat is controlling the surface area of the active material through particle size control, which is usually achieved by pulverizing and sieving the active material. The smaller the particle size, i.e. the larger the surface area, the better the battery performance, in particular the power capability, i.e. capacity values and discharge voltages at low temperatures and at high rates. However, battery safety, cycle life and self-discharge become worse as the particle size decreases. Because of these conflicting factors, there is a practical limitation in controlling the threshold temperature and heat evolution rate through particle size alone.

In order to improve stability of active material itself during charge-discharge, it has been suggested to dope other elements into the Ni-based or Co-based lithium oxide. For example, U.S. Pat. No. 5,292,601 discloses $Li_xMO_2$ (where M is at least one element selected from Co, Ni and Mn; and x is 0.5 to 1) as an improved material over $LiCoO_2$.

Another attempt to improve stability includes modifying the surface of the active material. Japanese Patent Laid-Open No. Hei 9-55210 discloses that lithium nickel-based oxide is coated with alkoxide of Co, Al and Mn and is heat-treated to prepare a positive active material. Japanese Patent Laid-Open No. Hei 11-16566 discloses lithium-based oxide coated with a metal and/or an oxide thereof. The metal includes Ti, Sn, Bi, Cu, Si, Ga, W, Zr, B or Mo. Japanese Patent Laid-Open No. Hei 11-185758 discloses coating a surface of lithium manganese oxide with a metal oxide by using a co-precipitation process and heat-treating the same to prepare a positive active material.

However, the above methods did not solve the fundamental problems associated with the safety of the battery: The threshold temperature wherein the active material prepared according to the above methods begins to react with an electrolyte, that is, the decomposition temperature, at which oxygen bound to metal of the active material begins to be released (exothermic starting temperature, $T_s$) does not shift sufficiently to a higher temperature and the amount of released oxygen (the value related to the exothermic heat) does not decrease sufficiently by the methods described above.

The structural stability of positive active material having the composition of $Li_{1-x}MO_2$ (M=Ni or Co) during charging is strongly influenced by the value of x. That is, when 0<x<0.5, cyclic stability is steadily and stably maintained, but when x is greater than or equal to 0.5, phase transition occurs from a hexagonal phase to a monoclinic phase. This phase transition causes an anisotropic volume change, which induces development of micro-cracks in the positive active material. These micro-cracks damage the structure of the active material, and thus the battery capacity decreases dramatically and the cycle life is reduced. Therefore, when anisotropic volume change is minimized, the capacity and the cycle life of the battery are improved.

In order to increase structural stability of positive active material, U.S. Pat. No. 5,705,291 discloses a method in which a composition comprising borate, aluminate, silicate or mixtures thereof was coated onto the surface of a lithiated intercalation compound, but it still has a problem with structural stability.

In the above description, positive active materials of lithium secondary batteries and related examples of developments were explained. Recently, in relation to the tendency to develop portable electronic equipment that is more compact and lightweight, other types of batteries have the same demands for an active material that guarantees battery performance, safety and reliability. Research and development is therefore accelerated on electrochemical properties and thermal stability of positive active materials to ensure improved performance, safety and reliability of batteries.

SUMMARY OF THE INVENTION

In order to solve the problems stated above, it is an object of the present invention to provide an active material for a battery with good electrochemical characteristics, such as capacity and cycle life.

It is another object to provide an active material for a battery with good thermal stability.

It is still another object to provide a method of preparing an active material with good manufacturing productivity and an economical preparation process.

In order to accomplish these and other objects, the present invention provides an active material for a battery having a surface treatment layer comprising the compound having the formula (I):

$$MXO_k \quad (1)$$

wherein M is at least one selected from the group consisting of an alkali metal, an alkaline earth metal, a group 13 element, a group 14 element, a transition metal and a rare-earth element; X is an element that can form a double bond with oxygen; and k is a numerical value in the range of 2 to 4.

The present invention also provides a process for preparing an active material for a battery comprising: preparing a coating liquid by adding a compound comprising an element X that is capable of forming a double bond with oxygen, and a compound comprising at least one from the group consisting of an alkali metal, an alkaline earth metal, a group 13 element, a group 14 element, a transition metal, and a rare-earth element, to water; adding active material to the coating liquid to coat the material with the suspension; and heat-treating the coated active material to form a surface-treatment layer comprising the compound of the formula (1).

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 12 shows the results of elemental analyses for components of a surface-treatment layer of active material prepared according to Example 1 of the present invention using Auger Spectroscopy.

DETAILED DESCRIPTION OF THE PREFERRED EMBODIMENTS

Figure 1:
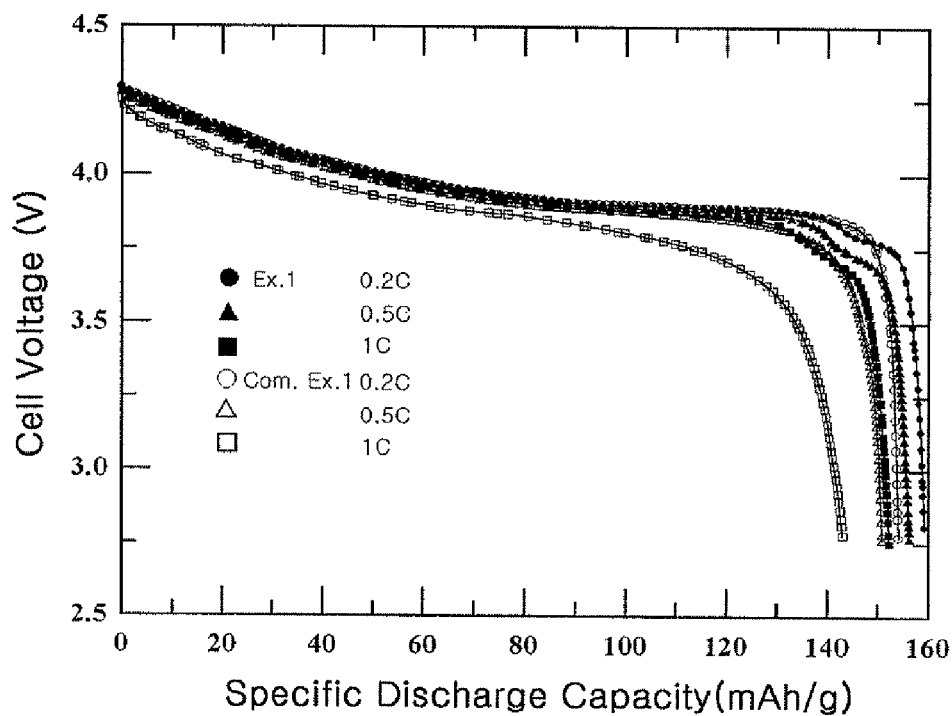
FIG. 1 shows voltage and capacity characteristics at various C-rate discharges of half-cells of Example 1 of the present invention and Comparative Example 1.

The active material for a battery of the present invention comprises a surface-treatment layer comprising a compound with the formula (I) on the surface thereof:

$$MXO_k \quad (1)$$

wherein M is at least one element selected from the group consisting of an alkali metal, an alkaline earth metal, a group 13 element, a group 14 element, a transition metal, and a rare-earth element; X is an element that is capable of forming a double bond with oxygen; and k is a numerical value in the range of 2 to 4.

The group 13 element (according to the new IUPAC agreement) refers to the element group including Al of the Periodic Table. The group 14 element (according to the new IUPAC agreement) refers to the element group including Si of the Periodic Table. In the preferred examples of the present invention, M includes Na, K, Mg, Ca, Sr, Ni, Co, Si, Ti, B, Al, Sn, Mn, Cr, Fe, V, Zr, or a combination thereof, and X is P, S, W or a combination thereof. The element X forms a double bond with oxygen, which means a classical chemical bonding. For example, in classical Chemistry, when X bonds with four oxygen elements, it means one double bond and three single bonds. However, in modern Chemistry, it means that X bonds with 1.25 oxygens because of delocalization of electrons.

The amount of element M of the compound with the formula (I) of the present invention is 0.1 to 15% by weight, preferably 0.1 to 6% by weight of the active material. Also, the amount of element X that is capable of forming a double bond with oxygen of the compound having the formula (I) is 0.1 to 15% by weight, preferably 0.1 to 6% by weight of the active material. When the amount of M or X present in the surface of the active material is not in the above range, electrochemical characteristics at a high rate are not improved and the thermal stability is not improved by the coating.

The thickness of the surface-treatment layer of the present invention is preferably 0.01 to 2 μm, and more preferably 0.01 to 1 μm. While other thicknesses are possible, if the thickness of the surface-treatment layer is less than 0.01 μm, the effect obtained from the surface-treatment layer may not be realized. In contrast, if the thickness is more than 2 μm, the capacity of the battery is deteriorated.

In the case that the surface-treated active material is a lithiated intercalation compound, a solid-solution compound between the lithiated intercalation compound and the $MXO_k$ compound with the formula (I) is formed on the surface of the active material in addition to the $MXO_k$ compound. In this case, a surface-treatment layer of the active material comprises both the solid-solution compound and the $MXO_k$ compound. The solid-solution compound comprises Li, M' (M' is at least one selected from the group consisting of Al, Ni, Co, Mn, Cr, Fe, Mg, Sr, V, and a rare-earth element, that originate from the lithiated intercalation compound), M (M is at least one selected from the group consisting of an alkali metal, an alkaline earth metal, a group element, a group 14 element, a transition metal, and a rare-earth element), X (an element capable of forming a double bond with oxygen), and O (oxygen).

When the surface-treatment layer comprising the solid-solution compound and the $MXO_k$ compound on the surface of these intercalation compounds is formed, the elements M and X have a concentration gradient from the surface of the active material toward the center of the active material particle grain. That is, M and X have a high concentration at the surface of the active material and the concentration gradually decreases toward the inside of the particle.

According to the preferable examples of the present invention, the active material for a battery comprising a lithiated intercalation compound and a surface-treatment layer comprising the solid-solution compound with Al and P, and $AlPO_k$ (k is 2 to 4) is provided.

The surface treatment technique of the active material with the $MXO_k$ compound of the present invention may be used for all batteries, and is effective in improving the performance characteristics of both active materials for the positive electrodes as well as the negative electrodes. The surface-treated active material includes materials that can undergo reversible electrochemical oxidation-reduction reactions. The electrochemically oxidizable and reducible material includes a metal, a lithium-containing alloy, sulfur-based compounds, compounds that can reversibly form lithium-containing compounds by a reaction with lithium ions, all materials that can reversibly intercalate/deintercalate lithium ions (lithiated intercalation compounds), although the present invention is not limited thereto.

The metal includes lithium, tin or titanium. The lithium-containing alloy includes a lithium/aluminum alloy, a lithium/tin alloy, or a lithium/magnesium alloy. The sulfur-based compound which is the positive active material of the lithium-sulfur battery includes a sulfur element, $Li_2S_n$ ($n \geq 1$), an organic sulfur compound and a carbon-sulfur polymer (($C_2S_x$)$_n$ where x=2.5 to 50 and n$\geq$2). The compound that can reversibly form a lithium-containing compound by a reaction with lithium ions includes silicon, titanium nitrate or tin oxide ($SnO_2$).

The active material that can reversibly intercalate/deintercalate lithium ion (lithiated intercalation compounds) includes carbon-based material, lithium-containing metal oxides, and lithium-containing chalcogenide compounds. The carbon-based material can be non-crystalline carbon, crystalline carbon, or a mixture thereof. Examples of the non-crystalline carbon includes soft carbon (low temperature calcinated carbon), and hard carbon (high temperature calcinated carbon). Examples of crystalline carbon include natural graphite or artificial graphite which are plate, sphere or fiber shape.

The lithium-containing metal oxide and lithium-containing chalcogenide compound has a monoclinic, hexagonal or cubic structure as a basic structure.

A conventional lithium-containing compound (lithium-containing metal oxide and lithium-containing chalcogenide compound) can be used as the lithiated intercalation compound of the present invention, and preferable examples are as follows:

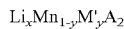  (2)

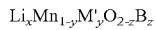  (3)

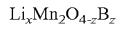  (4)

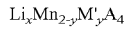  (5)

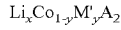  (6)

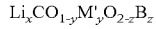  (7)

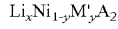  (8)

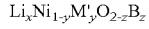  (9)

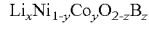  (10)

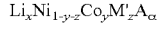  (11)

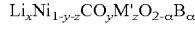  (12)

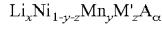  (13)

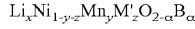  (14)

wherein $0.95 \leq x \leq 1.1$, $0 \leq y \leq 0.5$, $0 \leq z \leq 0.5$, and $0 < \alpha \leq 2$;

M' is at least one element selected from the group consisting of Al, Ni, Co, Mn, Cr, Fe, Mg, Sr, V, and a rare-earth element;

A is at least one element selected from the group consisting of O, F, S and P; and B is at least one element selected from the group consisting of F, S and P.

The average particle size of these lithiated intercalation compounds is preferably 1 to 20 μm, more preferably 3 to 15 μm.

In the present invention, a surface-treatment layer comprising the $MXO_k$ compound is formed on the surface of the active material. When the active material is a lithiated intercalation compound, a surface-treatment layer comprising a solid-solution compound including Li, M' (M' is at least one selected from the group consisting of Al, Ni, Co, Mn, Cr, Fe, Mg, Sr, V, and a rare-earth element that originate from lithiated intercalation compounds), M (M is at least one selected from the group consisting of an alkali metal, an alkaline earth metal, a group 13 element, a group 14 element, a transition metal, and a rare-earth element), X (an element capable of forming a double bond with oxygen) and O; as well as the $MXO_k$ compound, is formed.

As a general rule, the capacity of a battery cell using the active material with a high tap density is greater than one using a similar active material having a low tap density. Therefore, an improved tap density of the active material is generally desired for a battery cell. The active materials surface-treated according to the present invention show a much higher tap density than the corresponding equivalent active material without surface-treatment, indicating that the surface-treatment facilitates compaction of the active material powder. The tap density of the active material of the present invention is maintained at 1 to 3 g/cc, thus it increases the capacity of the battery cell. According to the preferable example of the present invention, the tap density of the active material is more than about 2 g/cc.

The active materials, with the surface-treated according to the present invention, also produces electrodes having a much higher electrode density, meaning more active material per unit volume, than the corresponding active material without surface-treatment, when the electrodes are fabricated by a conventional electrode fabrication process used by the Li-ion battery industries which involves a coating onto a current collector of an active material slurry comprising a conductive agent, a binder and a solvent in addition to the active material. When the electrodes are compacted by compression, the electrodes containing the surface-treated active material compact well without micro-cracks in the active material powder, while the electrode containing bare active material shows micro-cracks in the active material powder. The surface-treatment of the active material of the present invention might possibly provide a lubricating effect on the surface of the powder for improved compaction of the active material.

The most important factor affecting safety of a battery is the reactivity of the active material in a charged state at its surface toward the electrolyte. For example, one of lithiated intercalation compounds, $LiCoO_2$, has a structure of α-$NaFeO_2$, while it has a structure of $Li_{1-x}CoO_2$ during charge and discharge cycles. When it is charged at a voltage over 4.93V, Li is completely removed, and it has a structure of a hexagonal type of $CdI_2$. In such a lithium metal oxide, as the amount of lithium decreases, thermal stability decreases and it becomes a stronger oxidant. When a battery containing $LiCoO_2$ active material is fully charged, the active material composition becomes $Li_{1-x}CoO_2$ where x is greater than or equal to 0.5. Such a composition becomes unstable as the battery temperature rises, i.e., the oxygen bound with metal, that is cobalt, is released to form gaseous $O_2$. The released oxygen might react with electrolyte inside the battery, possibly leading to an explosion. Therefore, the oxygen-releasing temperature (exothermic reaction starting temperature) and the amount of exothermic heat released by the reaction are important factors to determine the safety of the battery. Such thermal stability can be evaluated from DSC (Differential Scanning Calorimetry) curves by determining the starting temperature of the exothermic reaction and the heat of reaction.

Unlike conventional active material, for the active material that is surface-treated with the $MXO_k$ compound of the present invention, the DSC exothermic peak is almost negligible in size since the $MXO_k$ compound inhibits reaction with electrolyte. Therefore, the active material of the present invention is substantially improved in thermal stability over the conventional surface-untreated active material.

The surface-treatment layer comprising the $MXO_k$ compound of the present invention may be applied to the active material for a primary battery such as a manganese battery, an alkaline battery, a mercury battery, a silver oxide battery, as well as to the active material for a secondary battery such as a lead-acid storage battery, a Ni-MH (nickel metal hydride) battery, a nickel-cadmium battery, a lithium metal battery, a lithium ion battery, a lithium polymer battery and a lithium-sulfur battery. The structures of such batteries, including a lithium secondary battery shell, are well known, as indicated, e.g., by U.S. Pat. No. 5,753,387, the disclosure of which is incorporated by reference herein. The active material having the surface-treatment layer is used in at least one of a positive electrode and a negative electrode of the above batteries.

The process for preparing active material having the surface-treatment layer of $MXO_k$ compound is as follows.

First, the coating liquid is prepared by reacting a compound comprising X (an element that is capable of forming a double bond with oxygen) with a compound comprising M (an alkali metal, an alkaline earth metal, a group 13 element, a group 14 element, a transition metal, a rare-earth element or a combination thereof) in water. In this invention, "coating liquid" refers to a homogeneous suspension or a solution.

Since water is used as a solvent in the coating liquid, the present process is advantageous over the process using an organic solvent for the process cost-reduction.

The choice of the compound type comprising element (X) has no particular limitation as long as the compound is soluble in water. For example, when X is P, it can be diammonium hydrogen phosphate ($(NH_4)_2HPO_4$), $P_2O_5$, $H_3PO_4$, or $Li_3PO_4$. The content of the compound comprising X is preferably 0.01 to 30% by weight, more preferably 0.1 to 20% by weight of the total weight of the coating liquid.

The element (M) used for the coating liquid is an alkali metal, an alkaline earth metal, a group 13 element, a group 14 element, a transition metal, a rare-earth element or a combination thereof. The preferable examples of these elements are Al, Ni, Co, Zr, Mn, Cr, Fe, Mg, Sr, V, or a combination thereof. The choice of the compound type comprising these elements has no particular limitation as long as the compound is soluble in water. The preferred examples are a nitrate and an acetate. The amount of the compound comprising an alkali metal, an alkaline earth metal, a group 13 element, a group 14 element, a transition metal, a rare-earth element or a combination thereof is preferably 0.01 to 30% by weight, more preferably 0.1 to 20% by weight of the weight of the coating liquid.

The coating liquid as prepared above is used to coat the active material. The coating may be achieved by simply adding a predetermined amount of the coating liquid to a given amount of the active material powder followed by a through mixing and optionally drying, although the present invention is not limited to this method.

Then, the coated active material is heat-treated at 100 to 700° C., preferably at 100 to 500° C. for 1 to 20 hours. If the heat-treatment process is over-done, an $AlPO_k$ (k is 2 to 4) compound diffuses into the inside of the active material resulting in a battery capacity decrease. Before the heat-treatment process, a separate drying process that dries the coated liquid may be used. In the present invention, since the heat-treatment process is made at a lower temperature and for a shorter time than a prior-art process using organic solvent, which requires a higher calcination temperature and a longer calcination time, it reduces cost during large-scale production.

In the prior-art process, a sieving process step is required since particle agglomerations occur usually due to a high calcination temperature. However, in the process of the present invention, such a sieving process is not required since the calcination temperature is significantly reduced resulting in negligible particle agglomerations.

The desired surface-treatment layer comprising the $MXO_k$ compound is formed on the surface of the active material after the heat-treatment process. When the active material being coated is a lithiated intercalation compound, a solid-solution compound which is formed by combination of the lithiated intercalation compound and the $MXO_k$ compound may be formed between the layer of $MXO_k$ compound and the active material.

In forming the battery, the method includes preparing a coating liquid by adding a compound including an element that is capable of forming a double bond with oxygen of lithium metal oxide, and a metal compound comprising at least one element from the group consisting of an alkali metal, an alkaline earth metal, a group 13 element, a group 14 element, a transition metal, and a rare-earth element, to water. An active material is added to the coating liquid to coat the active material. The coated active material is heat treated to prepare an active material having a surface-treatment layer comprising a compound having the formula (I):

$$MXO_k \quad (1)$$

wherein M is at least one element selected from the group consisting of an alkali metal, an alkaline earth metal, a group 13 element, a group 14 element, a transition metal, and a rare-earth element, X is an element that is capable of forming a double bond with oxygen, and k is a numerical value in the range of 2 to 4. Next, a slurry comprising the active material with the surface treatment layer is coated onto a current collector to prepare at least one of a positive and negative electrode which is used in the fabrication of a battery.

The present invention is further explained in more detail with reference to the following examples. These examples, however, should not in any sense be interpreted as limiting the scope of the present invention.

Example 1

A coating liquid was prepared by adding 1 g of $(NH_4)_2HPO_4$ and 1.5 g of aluminum nitrate ($Al(NO_3)_3 \cdot 9H_2O$) to 100 ml of water. The resulting liquid was a homogeneous colloidal suspension of amorphous $AlPO_k$ phase. After adding a 10 ml portion of the coating liquid to 20 g of $LiCoO_2$ powder having an average particle diameter of 10 μm, it was thoroughly mixed before drying at 130° C. for 30 minutes. The positive active material with the coating layer comprising a solid-solution compound including Al and P and the $AlPO_k$ compound on the surface was further heat-treated at 400° C. for 5 hours to obtain the desired coating. The total amount of Al and P was 1% by weight of the total active material weight.

The slurry for the positive electrode containing the positive active material as described, super P (conductive agent), and polyvinylidene fluoride (binder) in the weight ratio of 94/3/3 was prepared by mixing them thoroughly in an N-methylpyrrolidone (NMP) solvent. The slurry composition comprising the positive active material was coated on an Al foil at a thickness of about 300 μm, dried for 20 minutes at 130° C., and pressed under a 1 ton pressure to make a positive electrode for a coin cell. A coin-typed half-cell was prepared by using this positive electrode and lithium metal as a counter electrode. For the electrolyte, 1M $LiPF_6$ solution of mixed solvent of ethylene carbonate (EC) and dimethyl carbonate (DMC) in the volume ratio of 1:1 was used.

Example 2

A coin-typed half-cell was prepared by the same method as in Example 1, except that a ml portion of the coating liquid of Example 1 was added to 20 g of $LiCoO_2$ with an average particle diameter of 10 μm. The total amount of Al and P was 1.5% by weight of the total active material weight.

Example 3

A coin-typed half-cell was prepared by the same method as in Example 1, except that a ml portion of the coating liquid of Example 1 was added to 20 g of $LiCoO_2$ with an average particle diameter of 10 μm. The total amount of Al and P was 2% by weight of the total active material weight.

Example 4

A coin-typed half-cell was prepared by the same method as in Example 1, except that a 10 ml portion of the coating liquid of Example 1 was added to 20 g of $LiCoO_2$ with an average particle diameter of 5 μm. The total amount of Al and P was 1% by weight of the total active material weight.

Example 5

A coin-typed half-cell was prepared by the same method as in Example 1, except that the heat-treatment time was 10 hours.

Example 6

A coin-typed half-cell was prepared by the same method as in Example 1, except that the heat-treatment step was made at 500° C. for 5 hours.

Example 7

A coin-typed half-cell was prepared by the same method as in Example 1, except that the heat-treatment step was made at 500° C. for 10 hours.

Example 8

A coin-typed half-cell was prepared by the same method as in Example 1, except that a 20 ml portion of the coating liquid of Example 1 was added to 20 g of $LiCoO_2$ with an average particle diameter of 5 μm, and the heat-treatment step was made at 400° C. for 10 hours. The total amount of Al and P was 2% by weight of the total active material weight.

Example 9

A coin-typed half-cell was prepared by the same method as in Example 1, except that a 15 ml portion of the coating liquid of Example 1 was added to 20 g of $LiCoO_2$ with an average particle diameter of 10 μm, and the heat-treatment step was made at 400° C. for 10 hours. The total amount of Al and P was 1.5% by weight of the total active material weight.

Example 10

A coin-typed half-cell was prepared by the same method as in Example 1, except that $LiMn_2O_4$ with an average particle diameter of 13 μm was used instead of $LiCoO_2$.

Example 11

A coin-typed half-cell was prepared by the same method as in Example 1, except that $LiNi_{0.9}CO_{0.1}Sr_{0.002}O_2$ with an average particle diameter of 13 μm was used instead of $LiCoO_2$.

Example 12

A coin-typed half-cell was prepared by the same method as in Example 1, except that $LiNi_{0.8}Mn_{0.2}O_2$ with an average particle diameter of 10 μm was used instead of $LiCoO_2$ and the heat-treatment step was made at 400° C. for 10 hours.

Example 13

A coin-typed half-cell was prepared by the same method as in Example 1, except that 20 g of $LiNi_{0.8}Mn_{0.2}O_2$ with an average diameter of 10 μm was used instead of $LiCoO_2$, it was coated with 20 ml of coating liquid prepared in Example 1 and the heat-treatment step was made at 400° C. for 10 hours.

Example 14

A coin-typed half-cell was prepared by the same method as in Example 1, except that $Li_{1.03}Ni_{0.69}Mn_{0.19}CO_{0.1}Al_{0.17}Mg_{0.07}O_2$ with an average diameter of 13 μm was used instead of $LiCoO_2$.

Example 15

A slurry containing positive active material was prepared by mixing the positive active material of Example 1, super P (conductive agent), and polyvinylidene fluoride (binder) in the weight ratio of 96/2/2 in a mixing solvent of N-methylpyrrolidone (NMP). The positive electrode was prepared using this slurry by the same method as in Example 1. A slurry containing negative active material was prepared by mixing artificial graphite as a negative active material and polyvinylidene fluoride as a binder in the weight ratio of 90/10 in a mixing solvent of NMP. The negative electrode was prepared by casting the slurry containing the negative active material on a Cu foil. A 930 mAh prismatic Li-ion cell was fabricated using the positive and the negative electrodes. For the electrolyte, 1M $LiPF_6$ solution of a mixed solvent of ethylene carbonate/dimethyl carbonate in the volume ratio of 1/1 was used.

Example 16

A coin-typed half-cell was prepared by the same method as in Example 1, except that a 20 ml portion of the coating liquid of Example 1 was added to 20 g of natural graphite. The total amount of Al and P was 2% by weight of the total weight of the total active material weight.

Example 17

A coin-typed half-cell was prepared by the same method as in Example 1, except that a 20 ml portion of the coating liquid of Example 1 was added to 20 g of SnO$_2$. The total amount of Al and P was 2% of the total active material weight.

Example 18

A coin-typed half-cell was prepared by the same method as in Example 1, except that a 20 ml portion of the coating liquid of Example 1 was added to 20 g of silicon (Si) active material. The total amount of Al and P was 2% by weight of the total active material weight.

Comparative Example 1

A coin-typed half-cell was prepared by the same method as in Example 1, except that LiCoO$_2$ with an average particle diameter of 10 μm was used as the positive active material.

Comparative Example 2

A coin-typed half-cell was prepared by the same method as in Example 1, except that LiCoO$_2$ with an average particle diameter of 5 μm was used as the positive active material.

Comparative Example 3

A coin-typed half-cell was prepared by the same method as in Example 1, except that aluminum nitrate (Al(NO$_3$)$_3$.9H$_2$O) was not added to the coating liquid, and thus the active material coated with P$_2$O$_5$ on the surface was prepared.

Comparative Example 4

A coin-typed half-cell was prepared by the same method as in Example 1, except that LiMn$_2$O$_4$ with an average particle diameter of 13 μm was used as the positive active material.

Comparative Example 5

A coin-typed half-cell was prepared by the same method as in Example 1, except that LiNi$_{0.8}$Mn$_{0.2}$O$_2$ with an average particle diameter of 10 μm was used as the positive active material.

Comparative Example 6

A coin-typed half-cell was prepared by the same method as in Example 1, except that LiNi$_{0.9}$CO$_{0.1}$Sr$_{0.002}$O$_2$ with an average particle diameter of 13 μm was used as the positive active material.

Comparative Example 7

A coin-typed half-cell was prepared by the same method as in Example 1, except that Li$_{1.03}$Ni$_{0.69}$Mn$_{0.19}$Co$_{0.1}$Mg$_{0.07}$O$_2$ with an average particle diameter of 13 μm was used as the positive active material.

Evaluation of Electrochemical Characteristics

Charge-discharge characteristics of the coin-typed half-cell of Example 1 at 0.2C, 0.5C and 1C rates in the voltage range of 4.3V to 2.75V are shown in FIG. 1. For comparison, the characteristics of the cell of Comparative Example 1 are also shown. As seen in FIG. 1, the initial capacity of the cell of Comparative Example 1 is much smaller at a high rate (1C) than those at low rates (0.2C and 0.5C). However, the initial capacity of the cell of Example 1 is very high (152 mAh/g) even at the high rate. This value is close to those at low rates.

Figure 2:
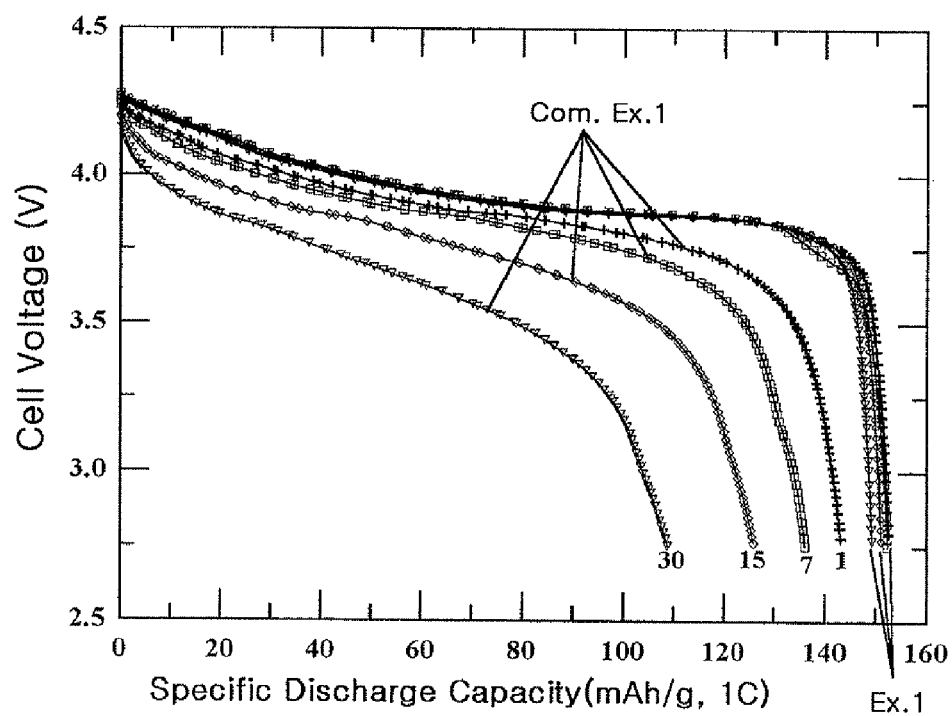
FIG. 2 shows voltage and capacity characteristics of half-cells according to Example 1 of the present invention and Comparative Example 1 at various cycle numbers at a 1C rate of discharge.

FIG. 2 shows capacity characteristics for cycling at 1C rate of the half-cells according to Example 1 and Comparative Example 1 in the voltage range of 4.3V to 2.75V. In the Example 1, more than 99% of initial capacity was maintained after 30 charge-discharge cycles. In contrast, the capacity of the cell of Comparative Example 1 decreased sharply after 30 charge-discharge cycles. In addition, the average discharge voltage of the cell of Comparative Example 1 decreased significantly with repeated cycling while the average value for Example 1 showed a negligible change.

Figure 3A:
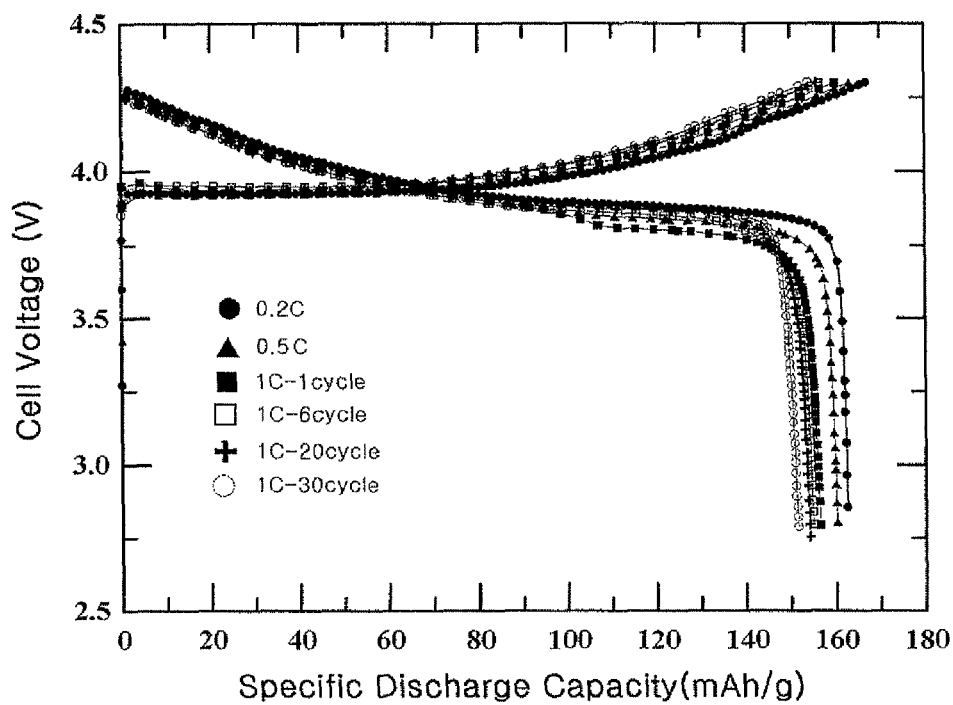
FIG. 3A shows charge and discharge curves of a half-cell according to Example 5 of the present invention at rates of 0.2C, 0.5C, and 1C in the voltage range of 4.3V to 2.75V.
Figure 3B:
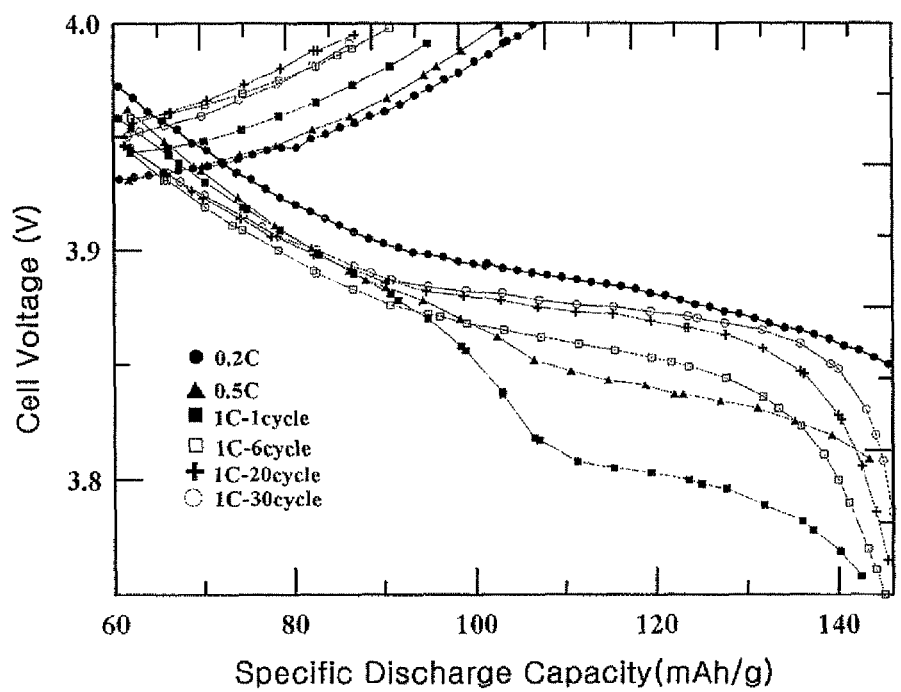
FIG. 3B is an expanded view of a portion of FIG. 3A.

FIG. 3A shows the charge-discharge characteristics of a half-cell according to Example 5 at 0.2C, 0.5C and 1C rates in the voltage range of 4.3V to 2.75V. In order to confirm reproducibility of charge-discharge characteristics, powder of the positive active material of Example 5 was synthesized in a large scale (1.5 kg batch size) and about thirty cells were made to evaluate the charge-discharge characteristics. FIG. 3A represents the average values. FIG. 3B is an expanded view of a portion of FIG. 3A. FIG. 3A shows that the initial capacity at 1C rate was 150-152 mAh/g and the average voltage was about 3.91V, which is similar to those at a low rate (0.2C). One noticeable observation was that the discharge curve at 1C rate gradually approaches that at 0.2C rate as the charge-discharge cycling at 1C rate proceeds. This means that there is a slight improvement rather than deterioration of discharge capacity due to a decrease in internal resistance with cycling.

Figure 4:
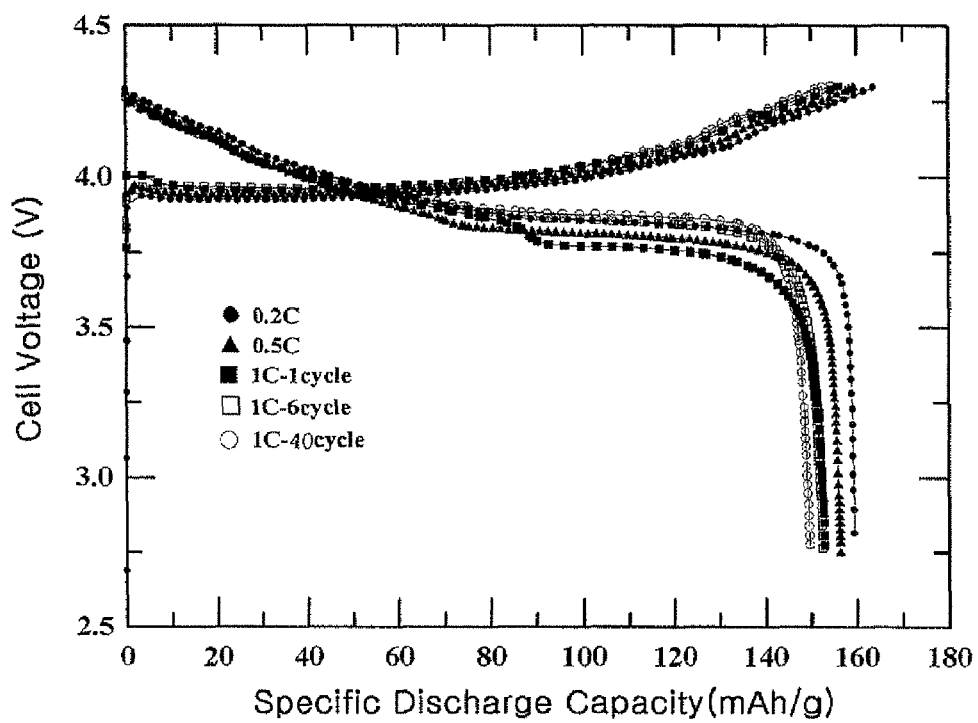
FIG. 4 shows charge and discharge curves of a half-cell according to Example 2 of the present invention at rates of 0.2C, 0.5C and 1C in the voltage range of 4.3V to 2.75V.
Figure 5:
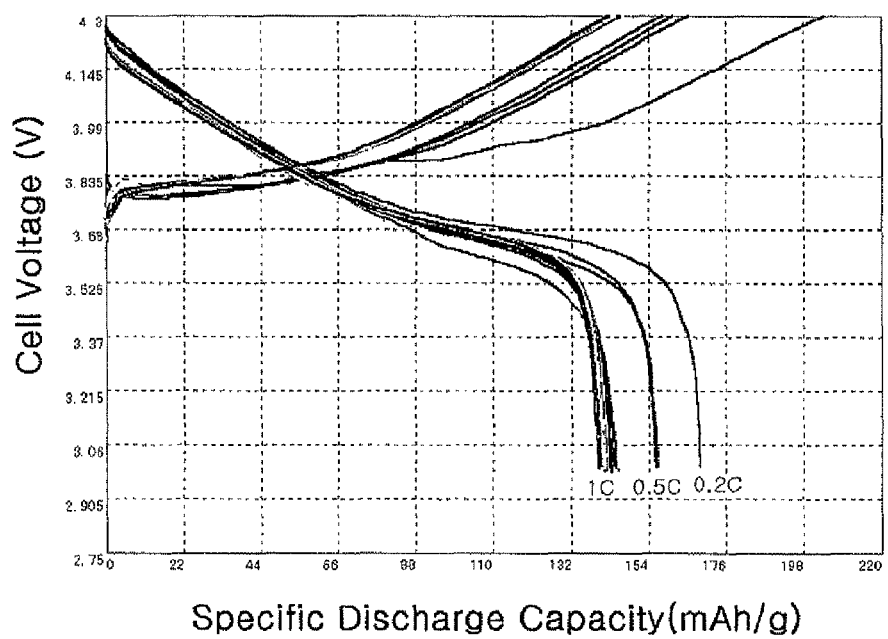
FIG. 5 shows charge and discharge curves of a half-cell according to Example 12 of the present invention at rates of 0.2C, 0.5C and 1C in the voltage range of 4.3V to 2.75V.

FIG. 4 shows the results of charge-discharge cycling of the cell of Example 2 at 0.2C, 0.5C and 1C rates in the voltage range of 4.3V to 2.75V. On repeated charge-discharge cycling, the average voltages at a 1C rate approach those at 0.2C rate. This observation is also similar to those of Example 12 as shown in FIG. 5. This observation indicates that the coating technique of the present invention is effective in improving the cell performance for Ni-based compounds as well as for Co-based compounds.

Discharge capacities of FIG. 1, FIG. 3A, FIG. 4 and FIG. 5 are summarized as shown in Table 1.

TABLE 1

| | discharge capacities at various C-rate rates (unit: mAh/g) | | | | |
| --- | --- | --- | --- | --- | --- |
| C-rate | Com. Ex. 1 | Ex. 1 | Ex. 2 | Ex. 5 | Ex. 12 |
| 0.2C | 154 | 159 | 159 | 161 | 170 |
| 0.5C | 151 | 156 | 156 | 159 | 161 |
| 1C | 143 | 152 | 152 | 152 | 146 |

Figure 6:
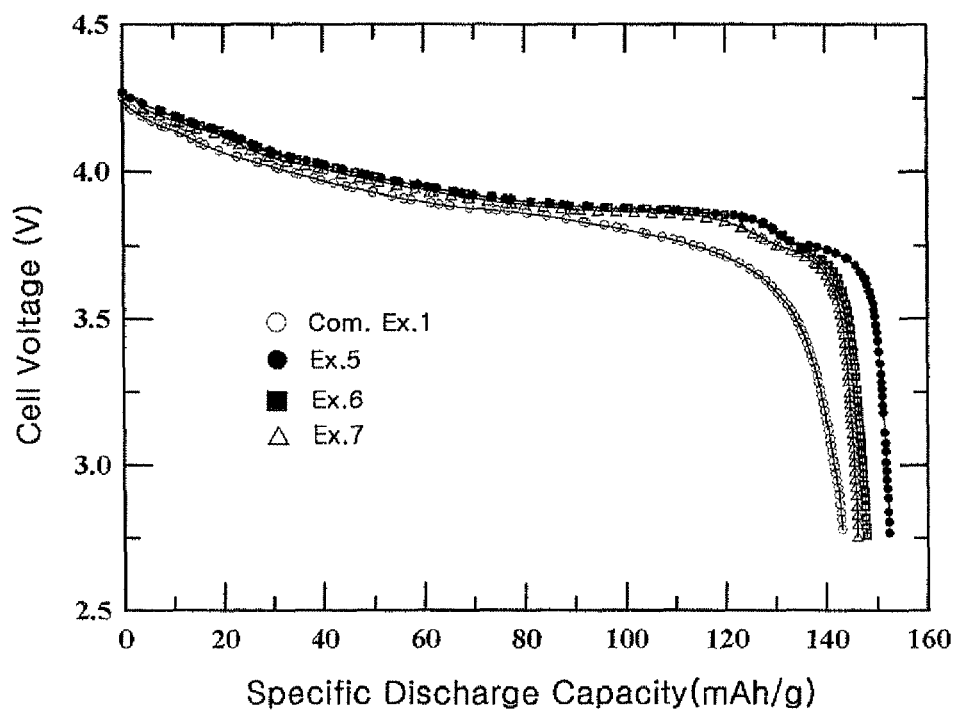
FIG. 6 shows voltage and discharge capacities of half-cells according to Examples 5 to 7 of the present invention and Comparative Example 1 at 1C rate of discharge.

In order to evaluate the effects of heat-treatment temperature and time on the electrochemical characteristics of cells, FIG. 6 shows the results of charge-discharge cycling of the cells of Examples 5 to 7 at 1C rate in the voltage range of 4.3V to 2.75V. The cells containing heat-treated positive active material powder at various heat-treatment temperatures and times showed improved high-rate characteristics over those of the cell containing the conventional uncoated LiCoO$_2$ (Comparative Example 1).

Figure 7:
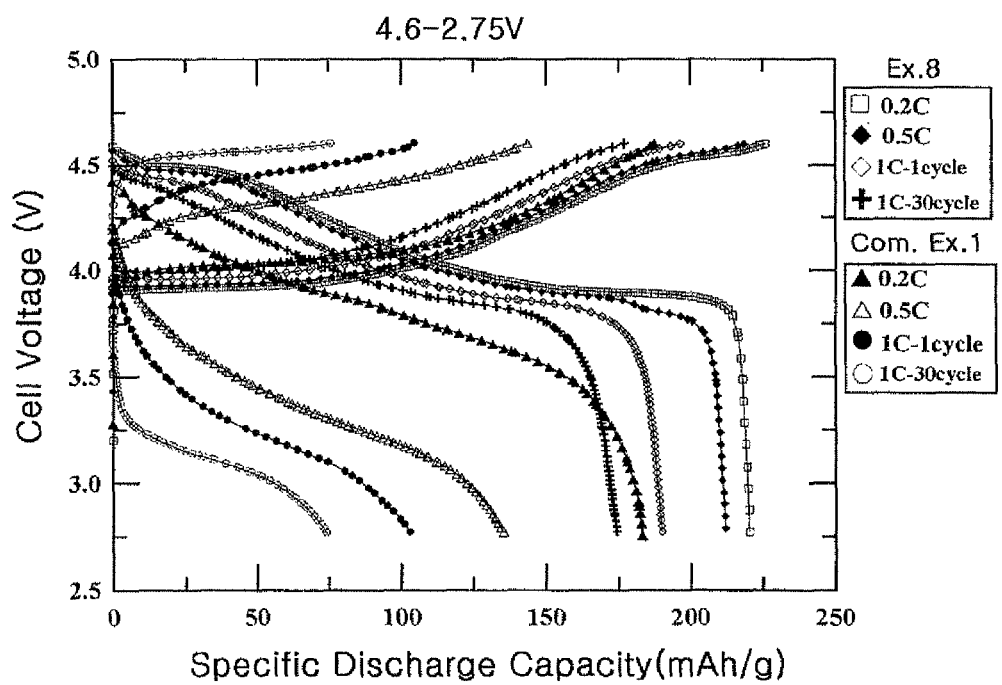
FIG. 7 shows charge and discharge curves of half-cells according to Example 1 of the present invention and Comparative Example 1 at rates of 0.2C, 0.5C and 1C in the voltage range of 4.6V to 2.75V.

FIG. 7 shows the results of charge-discharge cycling of cells of Example 1 and Comparative Example 1 at 0.2C, 0.5C and 1C rates in the voltage range of 4.6V to 2.75V instead of 4.3V to 2.75V. Comparative Example 1 shows that as the discharge rate increases, the discharge curve abruptly deteriorates and high cell polarization is indicated. The capacity at 1C rate after 30 cycles was less than 70% of the initial capacity. On the contrary, the cell of Example 1 showed remarkably improved 1C-rate characteristics; i.e., high discharge voltage and improved cycle life even after charging at 4.6V.

Figure 8:
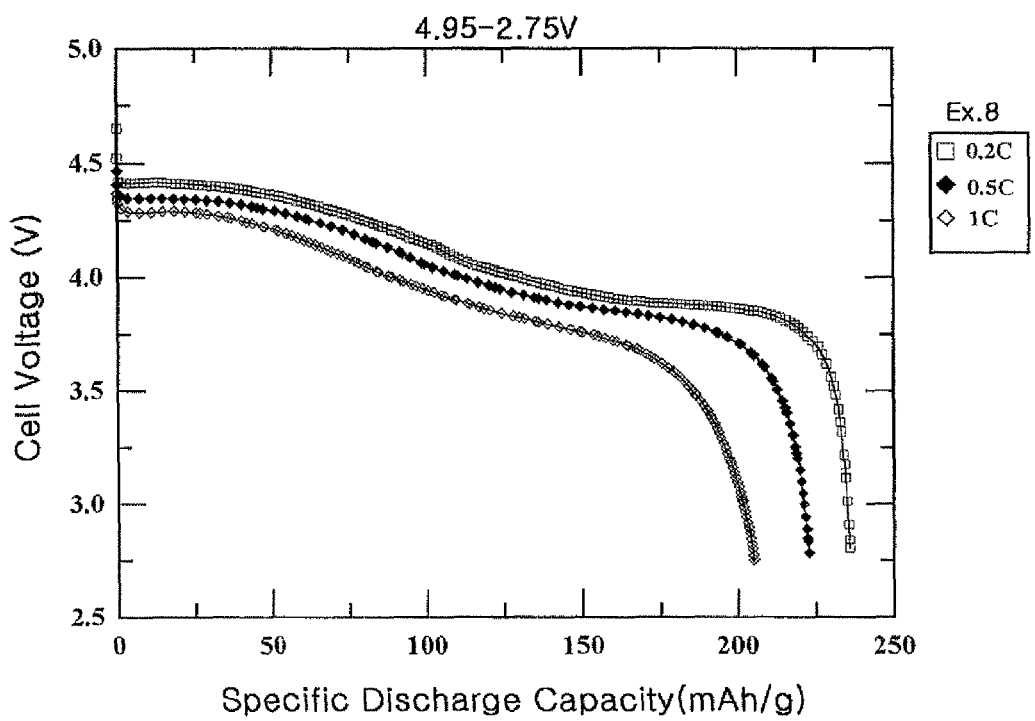
FIG. 8 shows discharge curves of a half-cell according to Example 1 of the present invention at rates of 0.2C, 0.5C and 1C in the voltage range of 4.95V to 2.75V.

FIG. 8 shows the results of charge-discharge cycling of cells of Example 1 and Comparative Example 1 at 0.2C, 0.5C and 1C rates in the voltage range of 4.95V to 2.75V. The cell of Comparative Example 1 did not show any measurable discharge capacity when it was charged at 4.95V, while the cell of Example 1 showed excellent discharge characteristics after charging at 4.95V, similar to the case of 4.6V charging.

As explained above, electrochemical characteristics of the cell containing positive active material of the present invention are excellent because the solid-solution compound including Al and P, and the $AlPO_k$ (k is 2 to 4) compound which is formed on the surface of the lithiated intercalation compound probably improve conductivity of lithium ions and reduce surface polarization at high rates.

Figure 9:
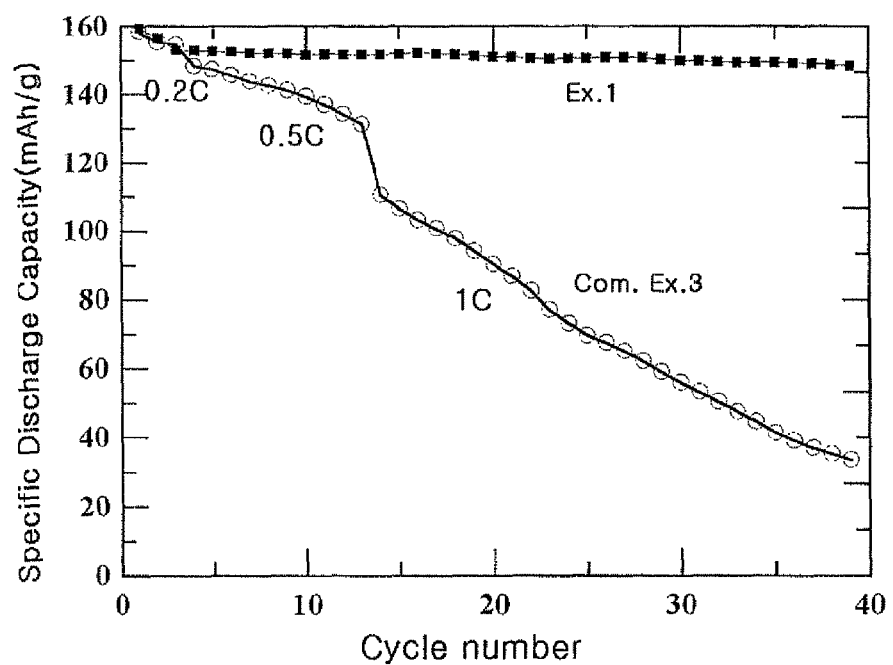
FIG. 9 shows cycle life characteristics at 1C rate of half-cells of Example 1 of the present invention and Comparative Example 3.

In order to verify the effect of the surface-treatment layer on the performance of the cell, cycle life characteristics at 1C rate of the cells of Example 1 containing the active material that has the surface-treatment layer comprising the solid-solution compound including Al and P on the surface as well as the $AlPO_k$ (k is 2 to 4) compound and the cell of Comparative Example 3 containing the active material consisting of a P-containing layer derived from $P_2O_5$, are shown in FIG. 9. Cycle life characteristics were measured by varying charge-discharge rate from 0.2C to 0.5C and 1C. As shown in FIG. 9, the cell capacity of Comparative Example 3 decreases rapidly with cycling, while the cell capacity of Example 1 is maintained constant with cycling at the initial value.

Figure 10:
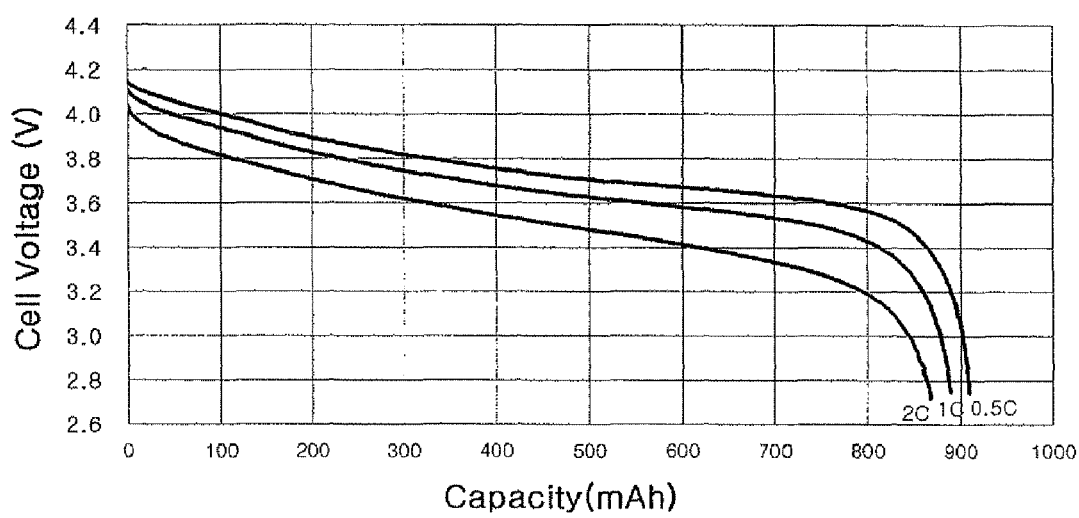
FIG. 10 shows discharge curves of a Li-ion cell comprising active material of Example 15 of the present invention at rates of 0.5C, 1C and 2C in the voltage range of 4.2V to 2.75V.

FIG. 10 shows discharge voltage curves of a 930 mAh prismatic Li-ion cell prepared in Example 15 at discharge rates of 0.5C, 1C and 2C in the voltage range of 4.2V to 2.75V. As shown in FIG. 10, the discharge capacity of the cell at 2C rate was more than 95% of that at 0.5C rate. Therefore, Li-ion cells comprising the active material prepared according to the present invention have excellent cell performance, similar to those of the coin-type half-cells.

In order to evaluate the relationship between tap density and capacity of the active material of the present invention, electrodes prepared in Example 1 and Comparative Example 1 were cut into 4×4 $cm^2$ pieces and then the amount of active material was analyzed. The amounts found were 150 mg in Example 1 and 120 mg in Comparative Example 1. Table 2 below shows electrode density, tap density and measured capacity of the active material. From Table 2, electrode density and tap density of the active material of Example 1 were larger than those of Comparative Example 1, and the specific capacity of Example 1 is higher than that of Comparative Example 1.

TABLE 2

| | Electrode density (g/cm³) | Tap density (g/cc) | Specific capacity at 0.2C (mAh/g) | Specific capacity at 0.5C (mAh/g) | Cell capacity (mAh) |
| --- | --- | --- | --- | --- | --- |
| Ex. 1 | 3.79 | 2.5 | 160 | 150 | 24 |
| Com. Ex. 1 | 3.42 | 2.1 | 160 | 143 | 19.2 |

Hereinafter, the structure and components of the surface-treatment layer will be explained.

Analysis of Structure and Components of Surface-Treatment Layer

Figure 11A:
FIGS. 11A to 11E show the results of elemental analyses of active materials prepared according to Example 1 of the present invention using Scanning Transmission Electron Microscopy (STEM).
Figure 11B:
Figure 11C:
Figure 11D:
Figure 11E:
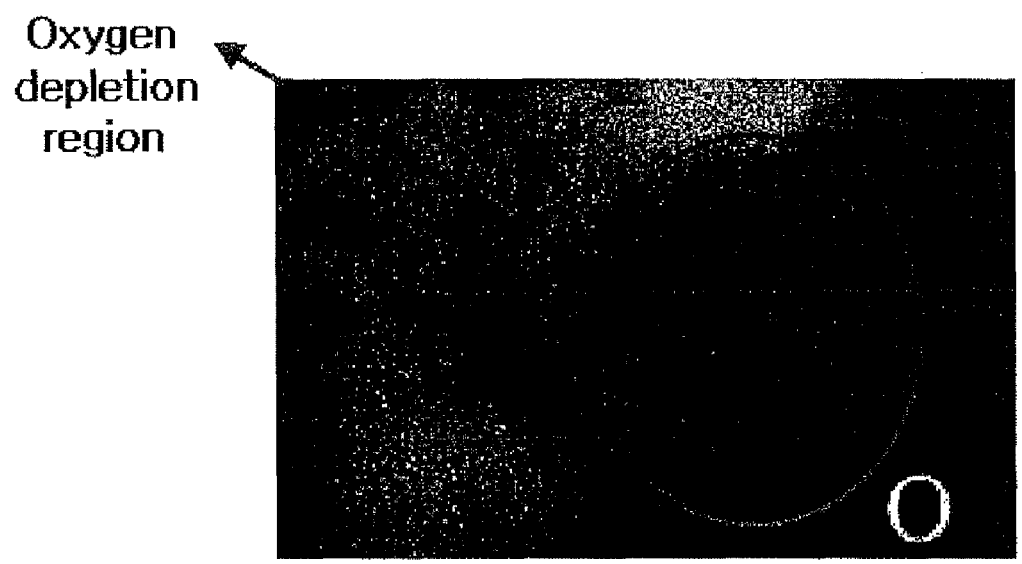

Active material prepared according to Example 1 of the present invention has a surface-treatment layer comprising a solid-solution compound including Al and P and an $AlPO_k$ (k is 2 to 4) compound on the surface of the active material. In order to confirm the presence of the surface-treatment layer, elemental mapping was performed on the surface of the cross-section of a grain of the surface-treated active material using STEM (Scanning Transmission Electron Microscopy). The results are shown in FIGS. 11A to 11E. FIG. 11A is a STEM photograph of active material in a bright field, and FIGS. 11B to 11E are STEM photographs showing distribution of Co, Al, P and O respectively. As shown in FIGS. 11B to 11E, Co, Al, P and O are all found in the surface portion of the particle, suggesting the existence of the solid-solution compound and the $AlPO_k$ (k is 2 to 4) compound.

In order to analyze components of the surface-treatment layer formed on the surface of the active material prepared according to Example 1, an analysis for Al, O, Co, and P was carried out using Auger spectroscopy. FIG. 12 shows the result from the surface to a depth of about 380 Å. FIG. 12 shows that a layer of the solid-solution compound including Al and P and another layer of the $AlPO_k$ (k is 2 to 4) compound were formed from the surface to a depth of about 230 Å, and $CoO_2$ (possibly $Li_{1-x}CoO_2$ where x is greater than or equal to 0.5) was formed further inside.

Figures 13A, 13B:
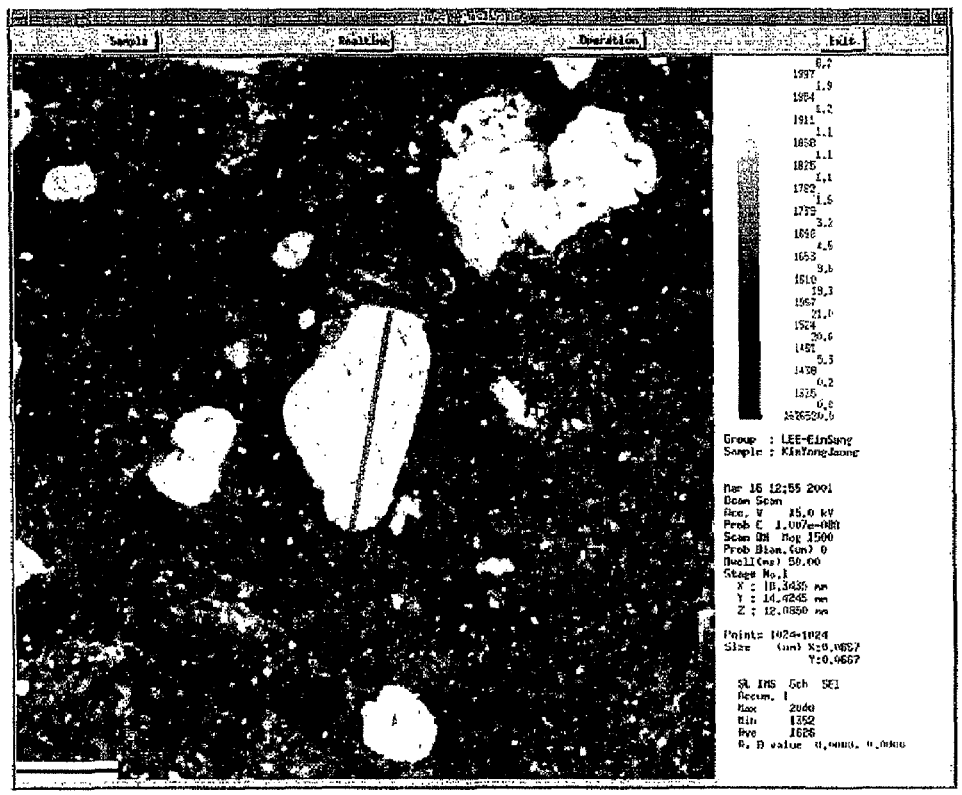
FIGS. 13A and 13B show the results of elemental distribution analyses for a cross-sectional view of active material prepared according to Example 1 of the present invention, by line scanning with Electron Probe Micro Analysis (EPMA).

In order to estimate distribution of various elements through the bulk of the particle, Electron Probe Micro Analysis (EPMA) for Co, Al, and P was performed by line scanning across the cross-section of a particle grain of the active material prepared in Example 1. FIGS. 13A and 13B show the results. As shown in FIG. 13B, the presence of Al and P was found only in the surface layer of the particle at less than 1 μm in depth. These results indicate that the solid-solution compounds including Al and P and the $AlPO_k$ (k is 2 to 4) compound in the surface-treatment layer did not diffuse further into the bulk of the active material.

Figure 14:
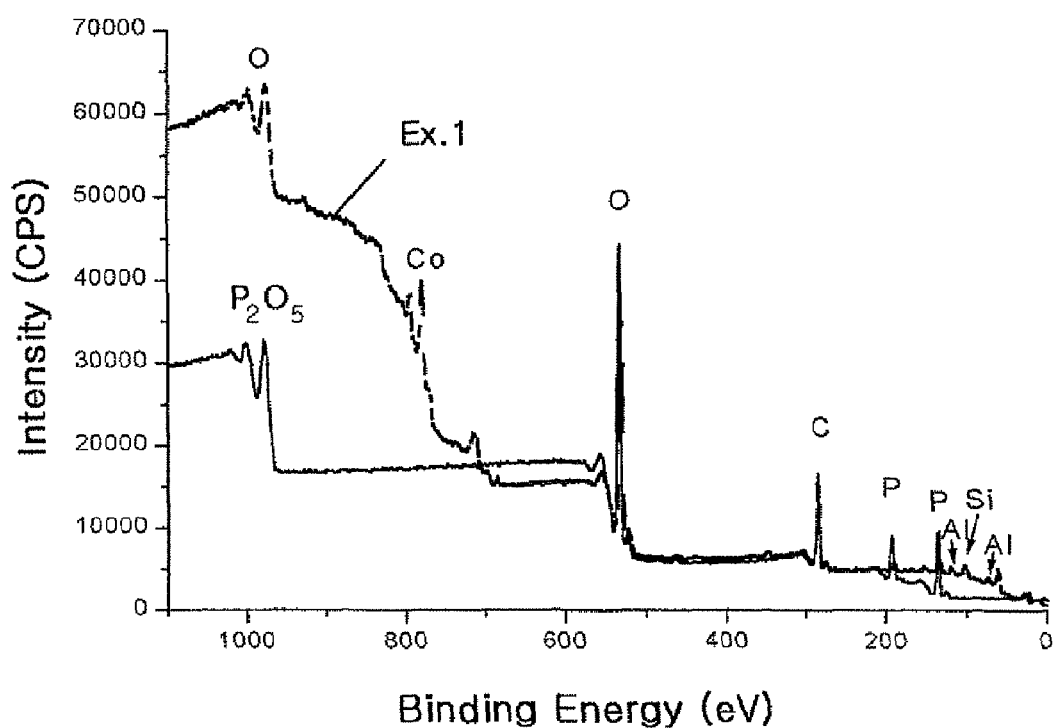
FIG. 14 shows the results of an analysis of a surface-treatment layer of active material of Example 1 of the present invention, by X-ray photoelectron spectroscopy (XPS).

FIG. 14 shows the results of analysis for the solid-solution compound including Al and P and $AlPO_k$ (k is 2 to 4) compound of surface-treatment layer of the active material prepared in Example 1 using X-ray photoelectron spectroscopy (XPS). From FIG. 14, it can be confirmed that peak positions of O and P in the surface-treated active material agrees well with that of $P_2O_5$, which indicates that a double bond of P=O exists in the solid-solution compound and the $AlPO_k$ compound. However, electrochemical characteristics of the solid-solution compound and the $AlPO_k$ (k is 2 to 4) compound are not identical to those of the $P_2O_5$ compound. For example, the capacity of the cell of Comparative Example 3 comprising active material coated with $P_2O_5$ on the surface deteriorates rapidly with high-rate (1C) cycling, while the cell of Example 1 containing the active material comprising the solid-solution compound and the $AlPO_k$ (k is 2 to 4) compound maintains good capacity and average voltage on cycling both at a high rate as well as at a low rate (see FIG. 9). This is probably because, although the solid-solution compound and the $AlPO_k$ compound of Example 1 and the $P_2O_5$ compound have a double bond in the surface layer of the active material, the $P_2O_5$ compound is different from the compounds in the surface-treatment layer in terms of effect on the mobility of lithium ions. That is, the solid-solution compound and the $AlPO_k$ compound that have a double bond probably promote the mobility of lithium ions so that the capacity at the high rate can be maintained at a high level.

Figure 15A:
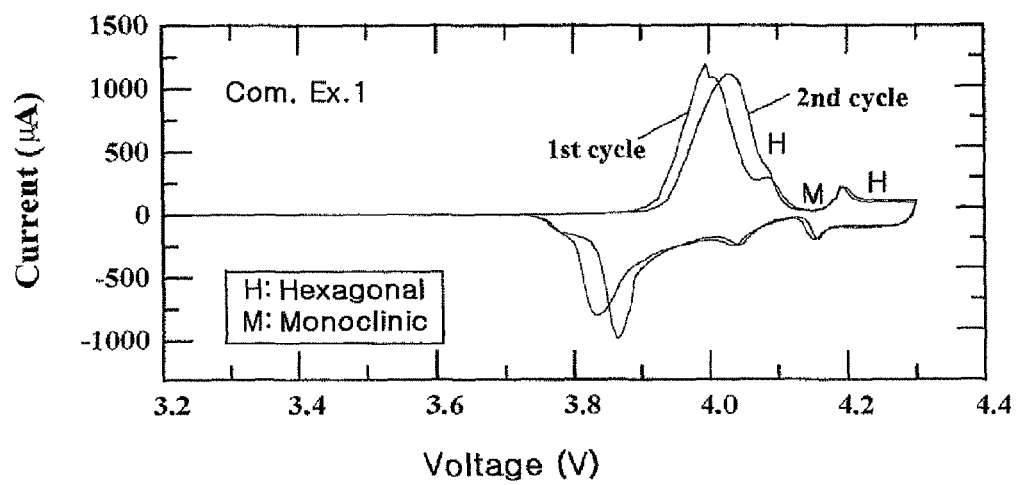
FIGS. 15A and 15B show cyclic voltammograms of active materials according to Example 5 of the present invention and Comparative Example 1.
Figure 15B:
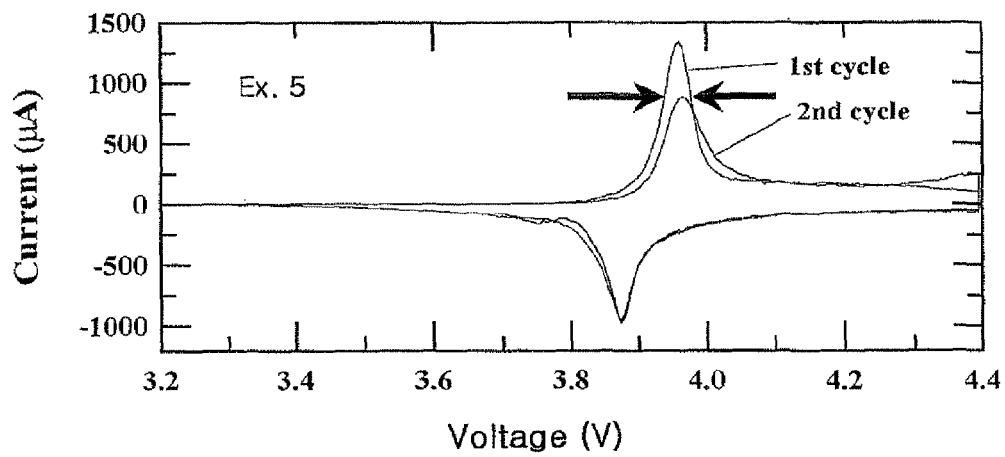

In order to verify the effect of the $AlPO_k$ compound upon the mobility of lithium ions, oxidation and reduction peaks of cyclic voltammograms of the cells of Comparative Example 1 and Example 5 were studied. The cyclic voltammograms were measured in the voltage range of 3V to 4.4V at a scanning rate of 0.02 mV/sec. Lithium metal was used as the reference electrode in the cell. FIGS. 15A and 15B show the results. The widths of oxidation/reduction peaks in the cyclic voltammogram of Example 5 are significantly smaller than those of Comparative Example 1, indicating that the electrode reaction rate is improved, and therefore, the mobility of lithium ions is also improved by the surface layer.

Figure 16:
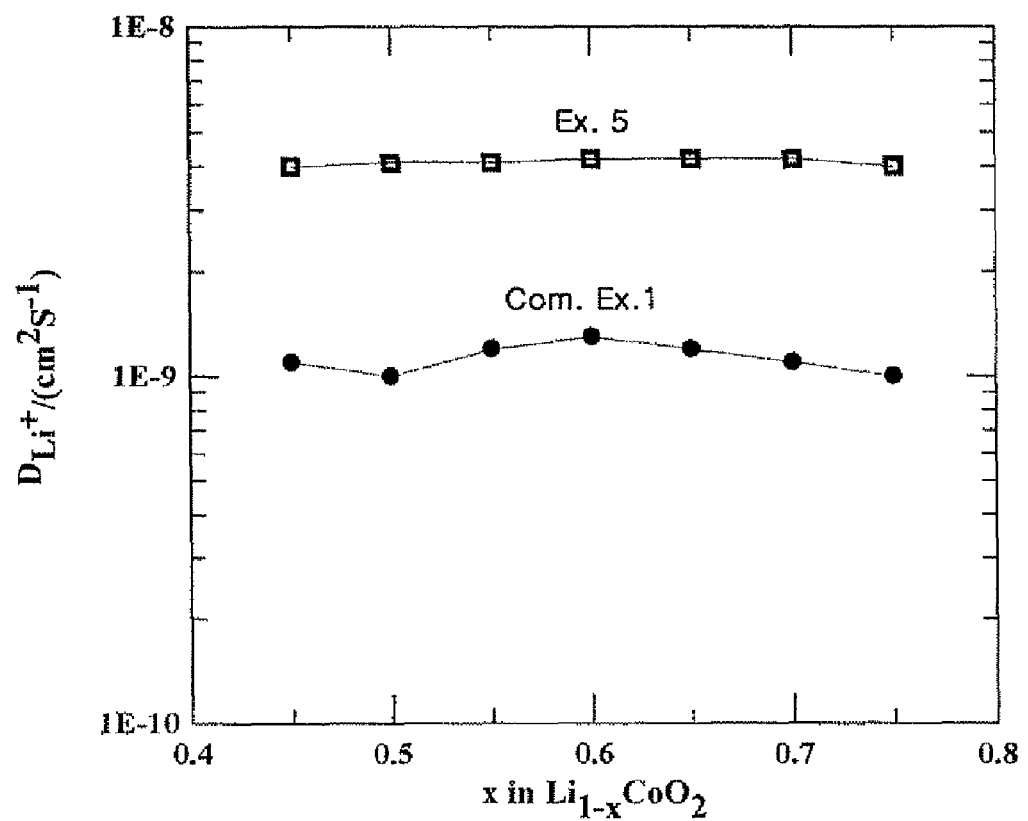
FIG. 16 shows diffusion coefficients ($D_{Li+}$) of lithium ions of active materials of Example 5 according to the present invention and Comparative Example 1.

The fact that the mobility of lithium ions in the compound formed on the surface of the present positive active material is high was confirmed by the measurement of diffusion coefficient of lithium ions as shown in FIG. 16. The diffusion coefficient of lithium ions for Example 5 of the present invention is five times as high as that of Comparative Example 1.

In addition, the cyclic voltammograms of FIG. 15A for Comparative Example 1 indicate that a phase transition occurs from a hexagonal phase to a monoclinic phase and then it returns to the hexagonal phase at about 4.1 to 4.25V. On the contrary, cyclic voltammograms of Example 5 (FIG. 15B) have no peak that is assumed to be related to this phase transition.

Figure 17A:
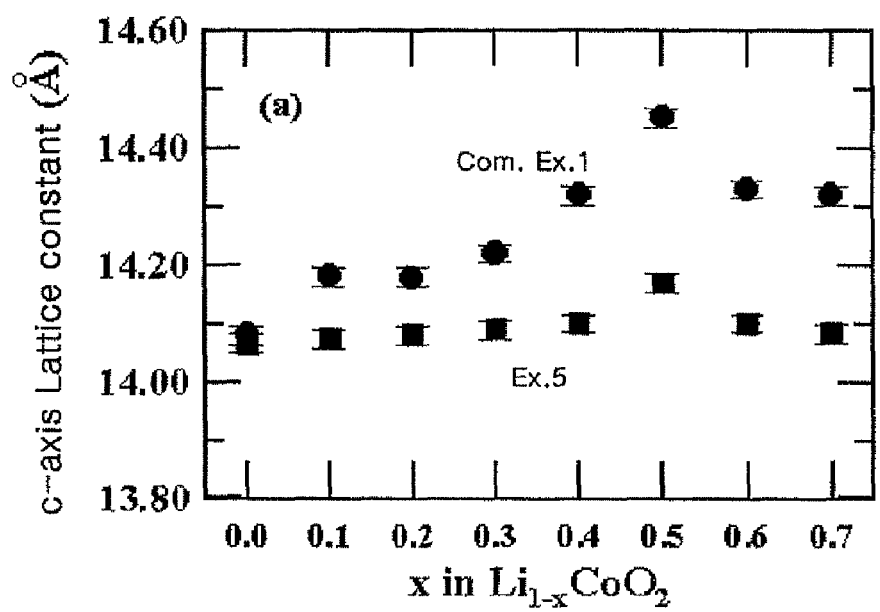
FIGS. 17A and 17B show changes of lattice constants of the active material in various states of charge of half-cells prepared according to Example 5 of the present invention and Comparative Example 1, in the voltage range of 4.6V to 4.25V.
Figure 17B:
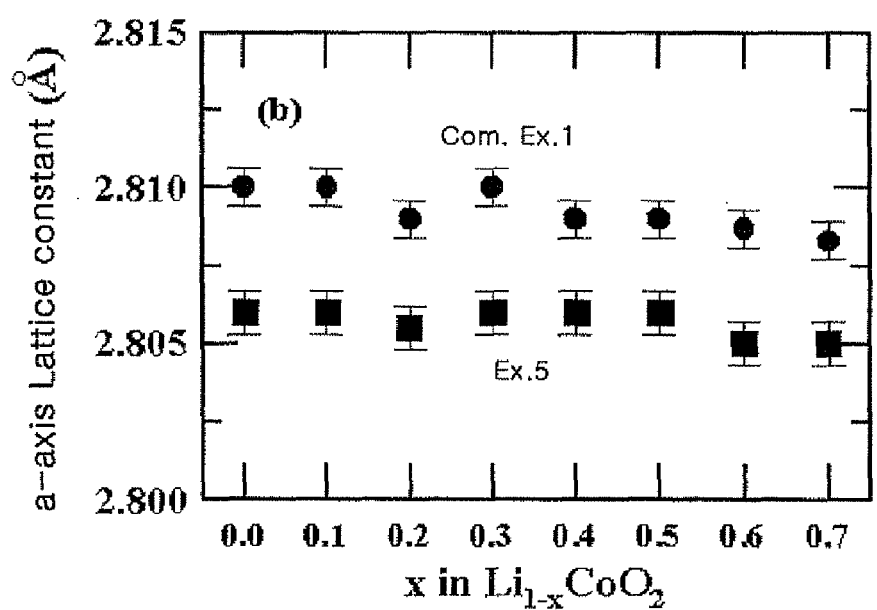

The reason that positive active material of the present invention does not show a peak that is assumed to be related to the phase transition in the cyclic voltammogram is because the c-axis, which affects volume expansion during charging, hardly changes. Changes of lattice constants (a-axis and c-axis) of active materials prepared according to Example 5 and Comparative Example 1 during charge-discharge in the voltage range of 4.6V to 4.25V were measured. FIGS. 17A and 17B show the results. Active material of Comparative Example 1 shows phase transitions from hexagonal (H) to monoclinic (M) and back to hexagonal (H) phase in the voltage range of 4.1 to 4.25V during charge-discharge. The change of the c-axis lattice constant was larger than that of the a-axis. When these anisotropic contraction and expansion are more than 0.2% of the elasticity limit of the active material, micro-cracks develop in the particles so that the particles break down to smaller particles causing the decrease of the cell capacity. As indicated in FIG. 17A, the active material of Comparative Example 1 had contraction and expansion of more than 1% in the c-axis so that micro-cracks occurred in the particles and thus the cell capacity decreased sharply as the discharge rate increased (see FIGS. 1 and 7). On the contrary, the cell of Example 5 showed a significantly reduced variation of lattice constant of the c-axis (FIG. 17A) so that the cell capacity was maintained high at the high rates of discharge (see FIGS. 1, 7 and 8).

Evaluation of Thermal Stability

In order to evaluate thermal stability of the positive active material prepared according to Example 5 of the present invention and Comparative Example 1, DSC analysis was performed as follows. The coin cells of Example 5 and Comparative Example 1 were charged using a voltage cut-off at 4.3V. About 10 mg of the positive active materials from charged electrodes of each cell were collected. DSC analyses were carried out in sealed aluminum cans using a 910 DSC (TA Instrument company) equipment by scanning temperatures from 25 to 300° C. at the rate of 3° C./min. The results are shown in FIG. 18.

Figure 18:
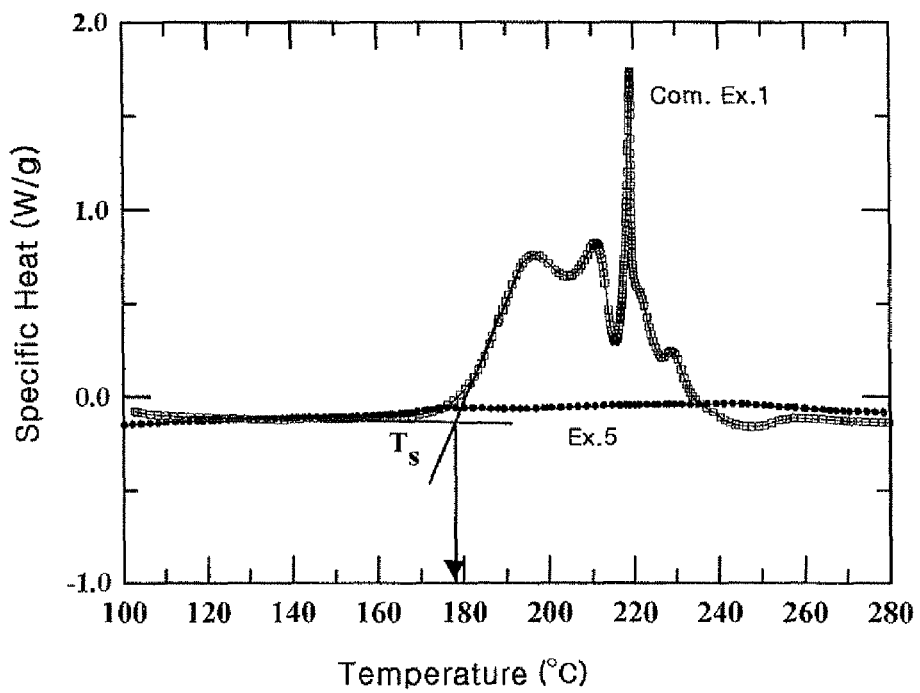
FIG. 18 shows the results of Differential Scanning Calorimetry (DSC) of active materials obtained after charging half-cells prepared according to Example 5 of the present invention and Comparative Example 1, at 4.3V.

As shown in the FIG. 18, Comparative Example 1 (not surface-treated $LiCoO_2$) showed a large exothermic peak in the temperature range of 180 to 220° C. as a result of $O_2$ release from the breakage of Co-0 bonds of charged $Li_{1-x}CoO_2$ followed by the exothermic reaction of the oxygen with electrolyte. This phenomenon is known as the cause of the safety problem. However, in the case of Example 5, the exothermic peak in the DSC was reduced to a negligible size, strongly suggesting that the thermal stability, and therefore the safety of the batteries using the active material of Example 5 will be much better than that of Comparative Example 1.

Figure 19:
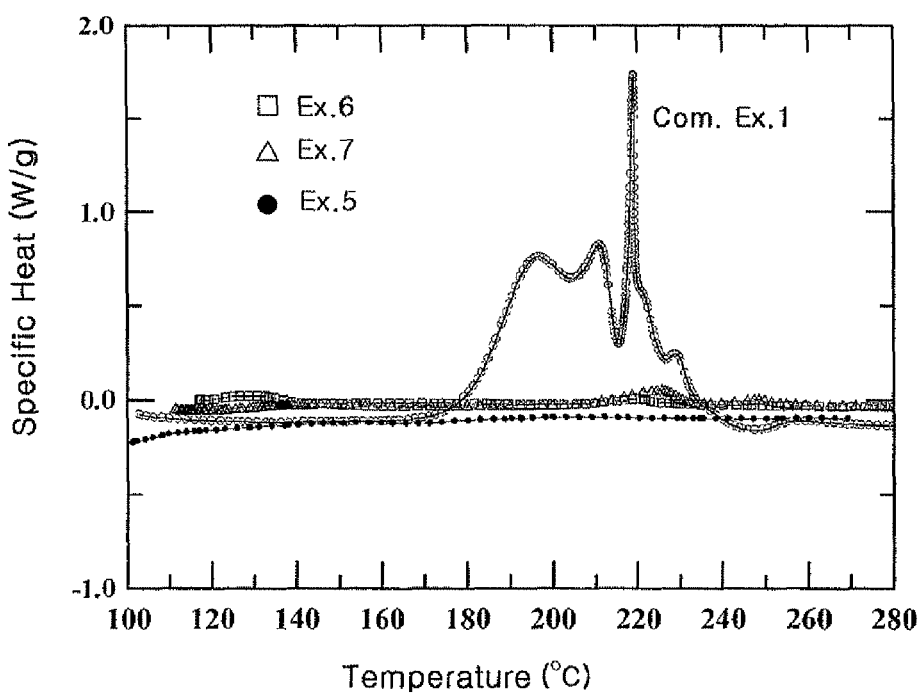
FIG. 19 shows the results of Differential Scanning Calorimetry (DSC) of active materials obtained after charging half-cells prepared according to Examples 5 to 7 of the present invention and Comparative Example 1, at 4.3V.

In order to evaluate the thermal stability of the active material as a function of the heat-treatment temperature and time, the DSC measurements of the charged electrodes at the cut-off voltage of 4.3V for the cells of Examples 6 and 7 were carried out as shown in FIG. 19. The open circuit voltage (OCV) of the cell disassembly was maintained at over 4.295V. As shown in FIG. 19, the electrode samples from the cells of Examples 5 to 7 showed excellent thermal stability.

Figure 20:
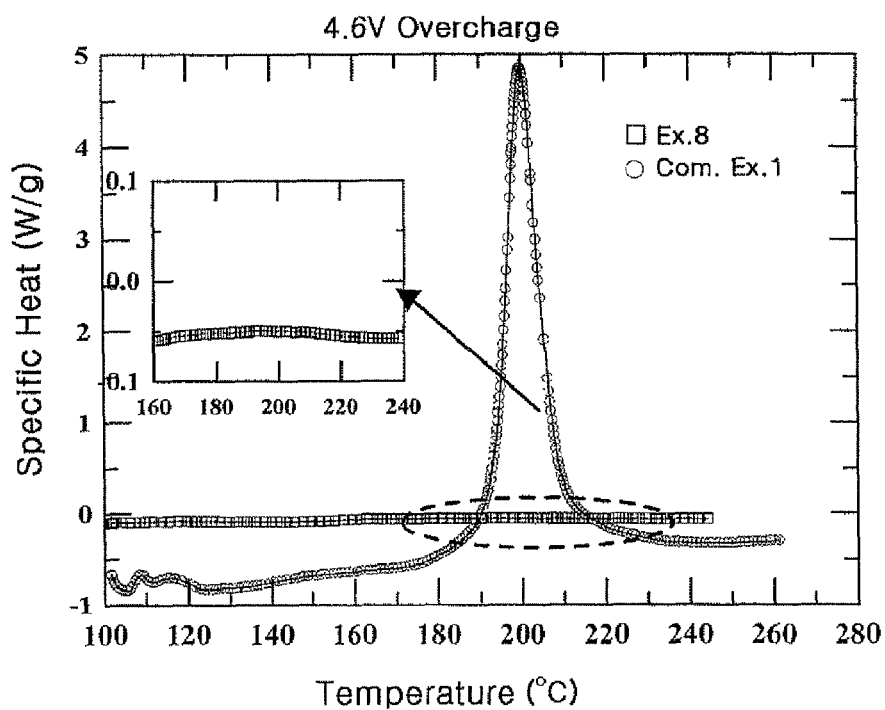
FIG. 20 shows the results of Differential Scanning Calorimetry (DSC) of active materials obtained after overcharging half-cells prepared according to Example 1 of the present invention and Comparative Example 1, at 4.6V.
Figure 21:
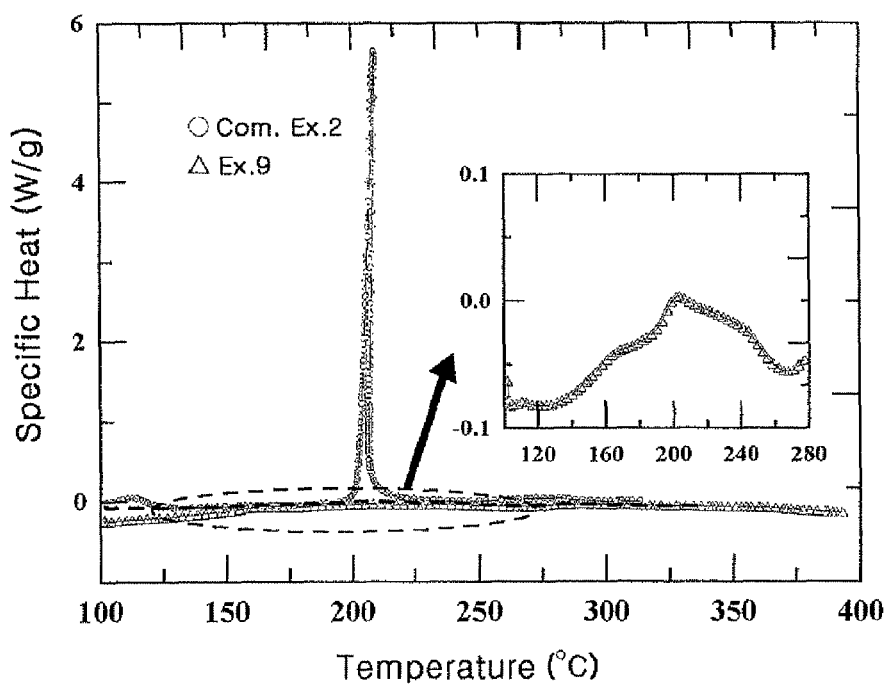
FIG. 21 shows the results of Differential Scanning Calorimetry (DSC) of active materials obtained after overcharging half-cells prepared according to Example 8 of the present invention and Comparative Example 2, at 4.6V.

After overcharging cells of Examples 1 and 8 at 4.6V, thermal properties of the charged cells were measured by the same method as in the case of 4.3V-charge. Results are shown in FIGS. 20 and 21. The cells of Examples 1 and 8 which were charged at 4.6V showed negligible exothermic heat evolution while those of Comparative Examples 1 and 2 which are charged at the same voltage showed large exothermic peaks indicating excellent thermal stability of the positive active material of the present invention.

Figure 22:
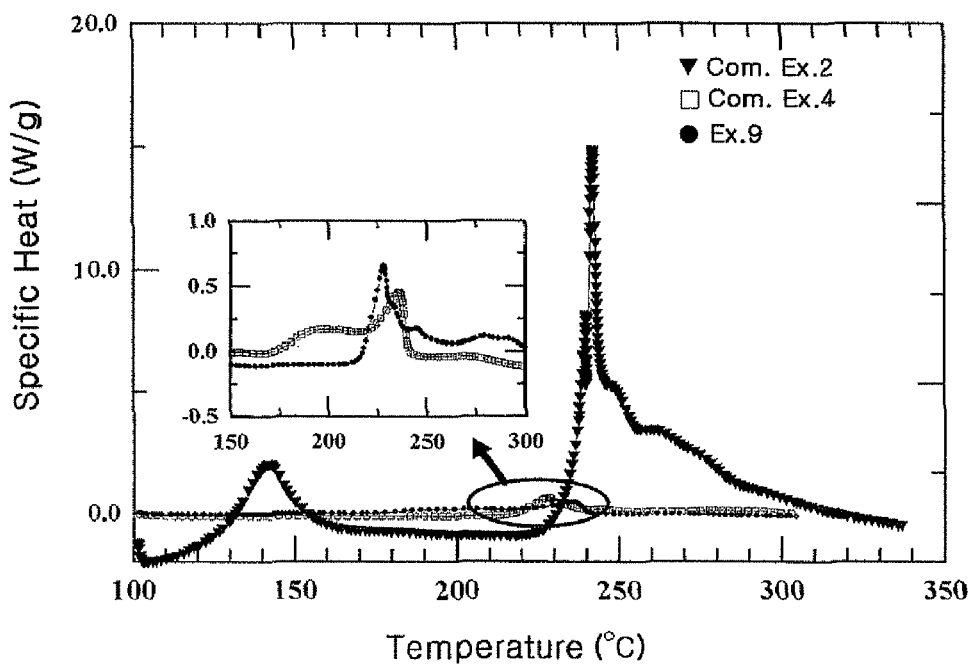
FIG. 22 shows the results of Differential Scanning Calorimetry (DSC) of active materials obtained after overcharging half-cells prepared according to Example 8 of the present invention and Comparative Examples 2 and 4, at 5V.
Figure 23:
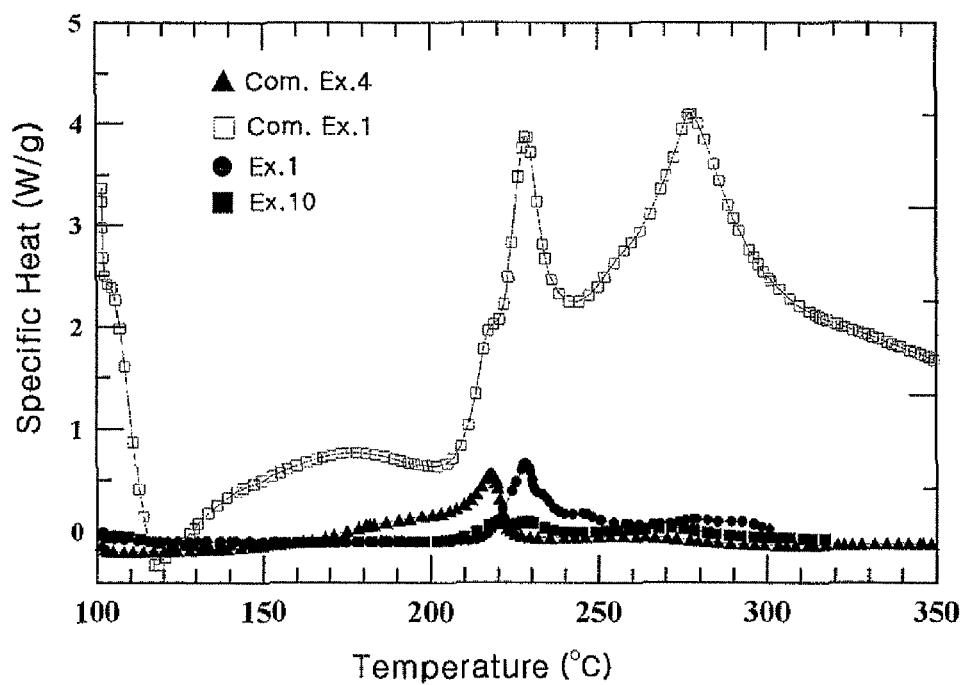
FIG. 23 shows the results of Differential Scanning Calorimetry (DSC) of active materials obtained after overcharging half-cells prepared according to Examples 1 and 9 of the present invention and Comparative Examples 1 and 4, at 5V.

If $LiCoO_2$ is overcharged at voltages over 4.93V, it turns to a $CdI_2$-type hexagonal structure that does not have Li. This structure has the least unstable state of the active material and it reacts rapidly with electrolyte at high temperature, releasing oxygen. After overcharging the cell of Example 8 at 5V, DSC measurement was carried out. The result is shown in FIG. 22. The DSC measurements of the cells of Examples 1 and 9 were also carried out. The results are shown in FIG. 23. As shown in FIGS. 22 and 23, in the case of overcharging to 5V, the cells of Comparative Examples 1 and 2 that do not have the surface-treatment layer show a low starting temperature ($T_s$) of the exothermic reaction and a relatively large exothermic heat, and multiple exothermic peaks were observed. Although active materials after overcharging the cells of Examples 1, 8 and 9, which contained positive active material coated with the solid-solution compound and the $AlPO_k$ (k is 2 to 4) compound, at 5V showed exothermic peaks unlike the case of the 4.3V- and 4.6V-charge, the starting temperature of the exothermic reaction was over 235° C. which is more than 40° C. higher than that of conventional $LiCoO_2$ (Comparative Examples 1 and 2) without the surface treatment.

The coated active material, $LiCoO_2$, according to the present invention, has comparable or better thermal stability and characteristics (Examples 1 and 9), as shown in FIG. 23, than uncoated $LiMn_2O_4$ (Comparative Example 4) active material which is known for its good thermal stability and characteristics among positive materials used in commercially available lithium secondary battery cells.

Figure 24:
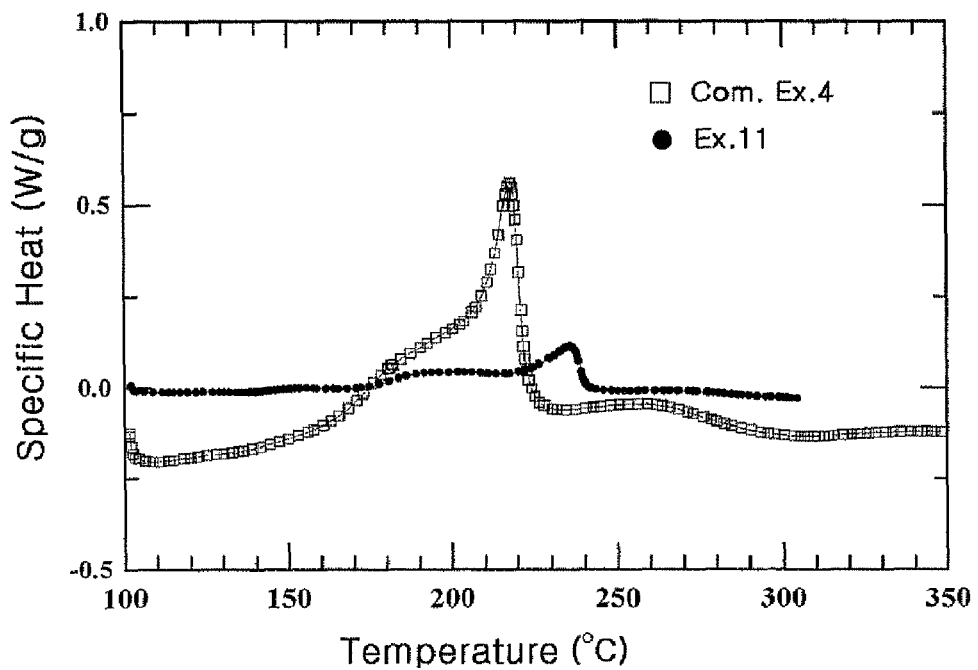
FIG. 24 shows the results of Differential Scanning Calorimetry (DSC) of active materials obtained after overcharging half-cells prepared according to Example 10 of the present invention and Comparative Example 4, at 5V.

In order to evaluate thermal stability of positive active materials of Example 10 and Comparative Example 4 (not surface-treated $LiMn_2O_4$), DSC measurements were carried out using a similar technique as described above. The results are shown in FIG. 24. Even without the surface-treatment, $LiMn_2O_4$ is known as the most thermally stable of positive active materials. The exothermic heat of active material containing the surface-treatment of the $AlPO_k$ compound is remarkably reduced from that of the untreated material indicating that the thermal stability is remarkably improved by the surface-treatment.

Figure 25:
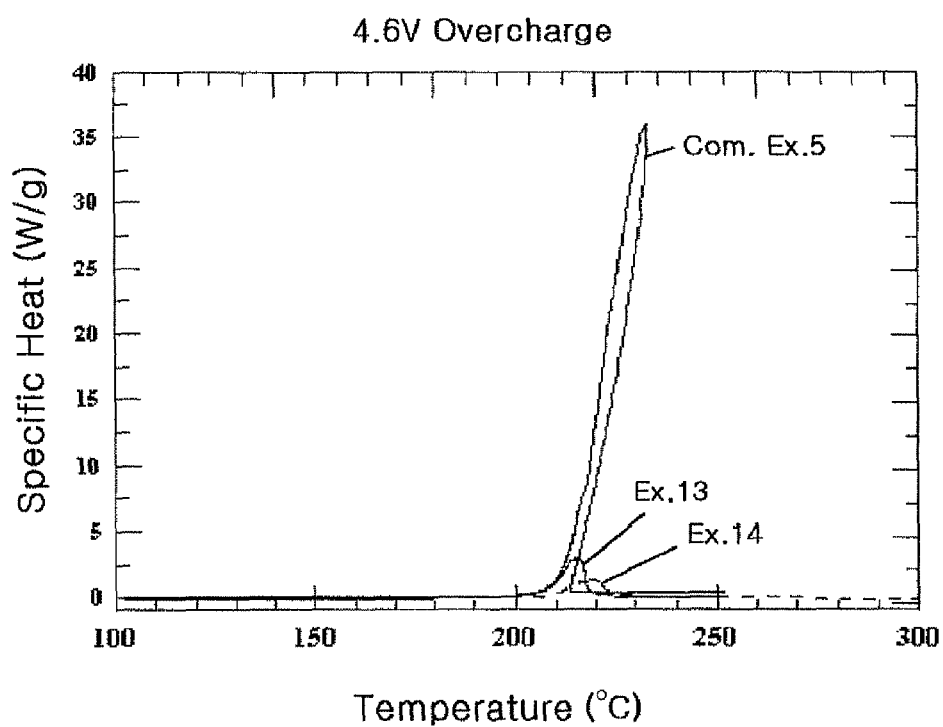
FIG. 25 shows the results of Differential Scanning Calorimetry (DSC) of active materials obtained after overcharging half-cells prepared according to Examples 12 and 13 of the present invention and Comparative Example 5, at 4.6V.

FIG. 25 shows the results of a DSC evaluation of the thermal stability of positive active materials of Examples 12 and 13 and Comparative Example 5 (not surface-treated $LiNi_{0.8}Mn_{0.2}O_2$). The cells of Examples 12 and 13 and Comparative Example 5 were overcharged at 4.6V. Fully charged positive electrode samples were taken from the cells. About 10 mg of the active material was removed from the electrode samples. The test material was sealed in an aluminum can and DSC thermograms were obtained using 910 DSC (TA Instrument company) equipment by scanning temperatures from 100 to 300° C. at the rate of 3° C./min. As shown in FIG. 25, the values of the exothermic heat of the surface-treated $LiNi_{0.8}Mn_{0.2}O_2$ active material according to Examples 12 and 13 decreased to about 1/30 of the value of the active material of Comparative Example 5 that was not surface-treated. Therefore, the thermal stability of the nickel manganese-based active material is improved significantly, similar to the cases of the cobalt-based and manganese-based active materials.

Twenty 930 mAh prismatic Li-ion cells comprising the positive active materials prepared in Examples 1, 8 and 9, and Comparative Examples 1 (conventional, not surface-treated, $LiCoO_2$) and 4 (conventional, not surface-treated, $LiMn_2O_4$) were safety tested for the categories of combustion, heat exposure and overcharge. The sample Li-ion cells were prepared by the same method as in Example 15. The combustion test was performed by heating cells using a burner, and measuring the percentage of the cells that underwent an explosion. The heat exposure test was performed by exposing the cells to 150° C. measuring times before an explosion time was measured. The overcharge test was carried out by observing the percentages of the sample cells that were overcharged at 1C rate. These results are presented in Table 3.

TABLE 3

|  | Com. Ex. 1 | Com. Ex. 4 | Ex. 1 | Ex. 8 | Ex. 9 |
|---|---|---|---|---|---|
| Combustion test (Explosion percentage) | 100% | 50% | 0% | 0% | 0% |
| Heat exposure test (Average explosion Time) | 5 min. | 20 min. | 90 min. | 95 min. | 95 min. |
| Overcharge test (Leak percentage) | 90% | 30% | 0% | 0% | 0% |

For the above safety tests for 930 mAh Li-ion cells comprising positive active materials of Examples 1, 8 and 9 and Comparative Examples 1 and 4, the overcharge test was carried out at three different charge rates, 1C, 2C, and 3C, as shown in Table 4. Five cells were tested for each charge rate.

TABLE 4

| C-rate | Com. Ex. 1 | Com. Ex. 4 | Ex. 1 | Ex. 8 | Ex. 9 |
|---|---|---|---|---|---|
| 1C | 5L5 | 5L0 | 5L0 | 5L0 | 5L0 |
| 2C | 5L5 | 5L5 | 3L0, 2L4 | 3L0, 2L4 | 3L0, 2L4 |
| 3C | 5L5 | 5L5 | 4L3, 1L4 | 4L3, 1L4 | 4L3, 1L4 |

The number preceding "L" indicates the number of tested cells.

The results of the safety test were rated as follows:
L0: good, L1: leakage, L2: flash, L2: flame, L3: smoke, L4: ignition, L5: explosion.

Figure 26:
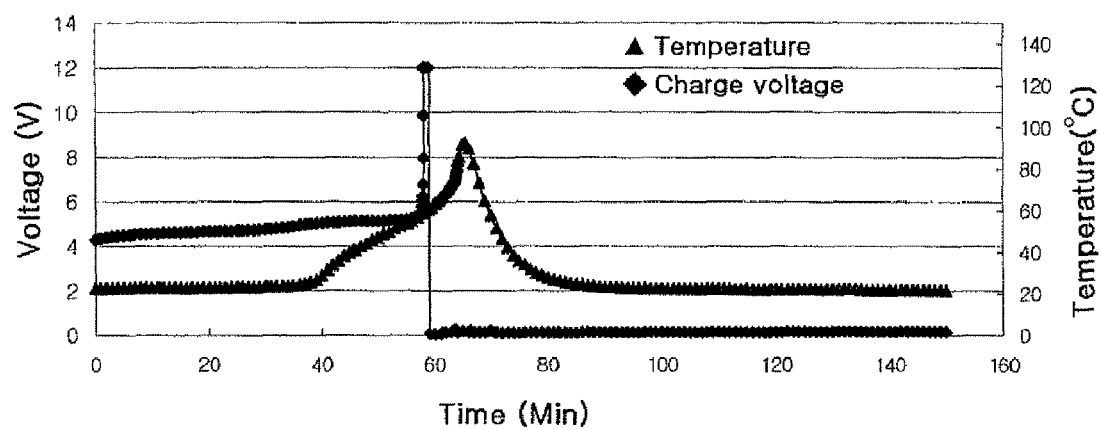
FIG. 26 shows charge voltage and cell temperature of a Li-ion cell comprising active material prepared in Example 1 when the cell is overcharged at 1C rate.

The temperature of the prismatic Li-ion cell of Example 15 was tested for the increased charge voltage to 12V as shown in FIG. 26. Generally, when the cell voltage dropped to 0V during the high-voltage overcharge, the cell explodes and the cell temperature increases abruptly. However, the cell of Example 15 did not show the increase of temperature over 100° C. when the charge voltage drops from 12V to 0V as shown in FIG. 26. Therefore, the cells prepared using the surface-treated active material of the present invention show excellent safety.

The active material containing a surface-treatment layer comprising the $MXO_k$ (k is 2 to 4) compound of the present invention shows excellent structural stability and high average discharge voltages both at high and low rates, excellent cycle life characteristics, and good capacity. Its excellent thermal stability improves the safety of the cells in various categories including combustion, heat exposure, and overcharge tests. In addition, the process of the present invention uses a water-based coating liquid giving a great low cost benefit over a similar process using an organic solvent-based solution. Since the process is performed at a lower temperature and in a shorter process time than the conventional process using an organic solvent, productivity is expected to be improved in large-scale production.

The foregoing is considered illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to that fall within the scope of the invention and the appended claims.

What is claimed is:

1. An active material for a battery, comprising:
   an electrochemically reversibly oxidizable and reducible base material selected from the group consisting of a lithium-containing metal oxide, and a lithium-containing chalcogenide compound; and
   a surface-treatment layer formed on the base material and comprising a solid-solution compound including surface treating elements M and X, and a compound of the formula $MXO_k$, wherein:
   M is at least one element selected from the group consisting of an alkali metal, an alkaline earth metal, a group 13 element, a group 14 element, a transition metal, and a rare-earth element,
   X is an element that is capable of forming a double bond with oxygen, and
   k is a numerical value in the range of 2 to 4, and
   an oxide comprising Li, M, and Co being present between the surface-treatment layer and the base material.

2. The active material of claim 1, wherein the element M is selected from the group consisting of Na, K, Mg, Ca, Sr, Ni, Co, Si, Ti, B, Al, Sn, Mn, Cr, Fe, V, Zr, and a combination thereof.

3. The active material of claim 1, wherein the element M is Al.

4. The active material of claim 1, wherein the element X is selected from the group consisting of P, S, W, and a combination thereof.

5. The active material of claim 1, wherein the element X is P.

6. The active material of claim 1, wherein the oxide is represented by $Li_{1-x}AlCoO_2$ wherein $0.5 \leqq x$ and $0 < y \leqq 1$.

7. The active material of claim 1, wherein an amount of the element M is 0.9 to 6 at % and an amount of the element X is 0.6 to 5 at % in the solid-solution compound at a surface of the active material to a depth of about 230 Å.

8. The active material of claim 1, wherein a concentration of the elements M and X decreases gradually from a surface to a center of a particle grain of the active material.

9. The active material of claim 1, wherein an amount of the Co is 14 to 29 at % in the solid-solution at a surface of the active material to a depth of about 230 Å.

10. The active material of claim 1, wherein a total amount of the element M in the active material is 0.1 to 15% by weight of the active material.

11. The active material of claim 1, wherein a total amount of the element M in the active material is 0.1 to 6% by weight of the active material.

12. The active material of claim 1, wherein a total amount of the element X is 0.1 to 15% by weight of the active material.

13. The active material of claim 1, wherein a total amount of the element X in the active material is 0.1 to 6% by weight of the active material.

14. The active material of claim 1, wherein a thickness of the surface-treatment layer is 0.01 to 2 μm.

15. The active material of claim 1, wherein a tap density of the active material is 1 to 3 g/cc.

16. The active material of claim 1, wherein the base material is at least one selected from the group consisting of lithium compounds represented by formulas (2) to (14):

$$Li_xMn_{1-y}M'_yA_2 \tag{2}$$

$$Li_xMn_{1-y}M'_yO_{2-z}B_z \tag{3}$$

$$Li_xMn_2O_{4-z}B_z \tag{4}$$

$$Li_xMn_{2-y}M'_yA_4 \tag{5}$$

$$Li_xCo_{1-y}M'_yA_2 \tag{6}$$

$$Li_xCo_{1-y}M'_yO_{2-z}B_z \tag{7}$$

$$Li_xNi_{1-y}M'_yA_2 \tag{8}$$

$$Li_xNi_{1-y}M'_yO_{2-z}B_z \tag{9}$$

$$Li_xNi_{1-y}Co_yO_{2-z}B_z \tag{10}$$

$$Li_xNi_{1-y-z}Co_yM'_zA_\alpha \tag{11}$$

$$Li_xNi_{1-y-z}Co_yM'_zO_{2-\alpha}B_\alpha \tag{12}$$

$$Li_xNi_{1-y-z}Mn_yM'_zA_\alpha \tag{13}$$

$$Li_xNi_{1-y-z}Mn_yM'_zO_{2-\alpha}B_\alpha \tag{14}$$

wherein $0.95 \leq x \leq 1.1$, $0 \leq y \leq 0.5$, $0 \leq z \leq 0.5$, and $0\alpha \leq 2$;

M' is at least one element selected from the group consisting of Al, Ni, Co, Mn, Cr, Fe, Mg, Sr, V, and a rare-earth element;

A is at least one element selected from the group consisting of O, F, S and P; and B is at least one element selected from the group consisting of F, S and P.

17. The active material of claim 1, wherein the base material is at least one selected from the group consisting of lithium compounds represented by formulas (6) to (7):

$$Li_xCo_{1-y}M'_yA_2 \tag{6}$$

$$Li_xCo_{1-y}M'_yO_{2-z}B_z \tag{7}$$

M' is at least one element selected from the group consisting of Al, Ni, Co, Mn, Cr, Fe, Mg, Sr, V, and a rare-earth element;

A is at least one element selected from the group consisting of O, F, S and P; and B is at least one element selected from the group consisting of F, S and P.

* * * * *